(12) United States Patent
Rediger

(10) Patent No.: US 11,591,452 B2
(45) Date of Patent: Feb. 28, 2023

(54) EMULSIFIER PARTICLES AND METHODS FOR MAKING AND USING SAME

(71) Applicant: INGEVITY SOUTH CAROLINA, LLC, North Charleston, SC (US)

(72) Inventor: Richard Arthur Rediger, Conyers, GA (US)

(73) Assignee: INGEVITY SOUTH CAROLINA, LLC, North Charleston, SC (US)

( * ) Notice: Subject to any disclaimer, the term of this patent is extended or adjusted under 35 U.S.C. 154(b) by 498 days.

(21) Appl. No.: 16/746,367

(22) Filed: Jan. 17, 2020

(65) Prior Publication Data
US 2020/0148855 A1    May 14, 2020

Related U.S. Application Data

(62) Division of application No. 14/952,953, filed on Nov. 26, 2015, now abandoned.
(Continued)

(51) Int. Cl.
*C08K 5/17* (2006.01)
*C09K 8/035* (2006.01)
(Continued)

(52) U.S. Cl.
CPC .............. *C08K 5/175* (2013.01); *B01F 23/41* (2022.01); *B01F 23/802* (2022.01);
(Continued)

(58) Field of Classification Search
CPC .......... C08K 5/175; C08K 5/20; C09K 8/035; C09K 8/36; C09K 23/00; B01F 23/41;
(Continued)

(56) References Cited

U.S. PATENT DOCUMENTS

| | | |
|---|---|---|
| 4,108,779 A | 8/1978 | Carney et al. |
| 4,508,628 A | 4/1985 | Walker et al. |

(Continued)

FOREIGN PATENT DOCUMENTS

CN    103980869    8/2014

OTHER PUBLICATIONS

Supplementary European Search Report for EP 15862382.7, dated Oct. 16, 2018.

(Continued)

*Primary Examiner* — Aiqun Li
(74) *Attorney, Agent, or Firm* — Bryan D. Zerhusen, Esq.; Nicholas R. Herrel, Esq.; Cantor Colburn LLP

(57) ABSTRACT

Emulsifier particles and methods for making and using same. The emulsifier particles can include an alkali metal salt or an alkaline earth metal salt of a carboxylic acid terminated fatty amine condensate, an alkali metal salt or an alkaline earth metal salt of a modified tall oil, or a blend of an alkali metal salt or an alkaline earth metal salt of a carboxylic acid terminated fatty amine condensate and an alkali metal salt or an alkaline earth metal salt of a modified tall oil. The emulsifier particles can have a BET specific surface area of about 0.3 m²/g to about 1 m²/g. The method for making the emulsifier particles can include reducing a size of an emulsifier solid via a mechanical attrition process to produce the emulsifier particles.

16 Claims, 1 Drawing Sheet

Related U.S. Application Data

(60) Provisional application No. 62/085,314, filed on Nov. 27, 2014.

(51) Int. Cl.
  *B01F 23/41* (2022.01)
  *B01F 23/80* (2022.01)
  *C09K 23/00* (2022.01)
  *B01F 101/27* (2022.01)

(52) U.S. Cl.
  CPC .......... *B01F 23/804* (2022.01); *B01F 23/807* (2022.01); *B01F 23/81* (2022.01); *C09K 8/035* (2013.01); *C09K 23/00* (2022.01); *B01F 23/4142* (2022.01); *B01F 23/4145* (2022.01); *B01F 2101/27* (2022.01)

(58) Field of Classification Search
  CPC .... B01F 23/802; B01F 23/804; B01F 23/807; B01F 23/81; B01F 23/4142; B01F 23/4145; B01F 2101/27
  See application file for complete search history.

(56) References Cited

U.S. PATENT DOCUMENTS

| | | |
|---|---|---|
| 5,935,894 A | 8/1999 | Kanazirev et al. |
| 8,258,084 B2 | 9/2012 | Hurd et al. |
| 2003/0130135 A1 | 7/2003 | Hou et al. |
| 2004/0171498 A1 | 9/2004 | Miller et al. |
| 2007/0093393 A1 | 4/2007 | Navarrete et al. |
| 2007/0167333 A1 | 7/2007 | Hurd et al. |
| 2009/0283444 A1 | 11/2009 | Opinder et al. |
| 2010/0041809 A1 | 2/2010 | Cavalier et al. |
| 2011/0110045 A1 | 9/2011 | Kou et al. |
| 2011/0306523 A1 | 12/2011 | Yu et al. |
| 2013/0008341 A1* | 1/2013 | Hunt .................. C08K 5/11 106/14.44 |
| 2013/0079258 A1 | 3/2013 | Hurd et al. |
| 2015/0034554 A1 | 2/2015 | Di Maiuta et al. |

OTHER PUBLICATIONS

International Preliminary Report on Patentability for PCT/US2015/062815, dated May 30, 2017.
International Search Report and Written Opinion for PCT/US2015/062815, dated Mar. 7, 2016.

* cited by examiner

EMULSIFIER PARTICLES AND METHODS FOR MAKING AND USING SAME

CROSS-REFERENCE TO RELATED APPLICATION

This application is a divisional application of U.S. Patent Application No. 14/952,953, filed 26 Nov. 2015, published as U.S. Patent Application Publication No. 2016/0152797 A1 on 2 Jun. 2016, which claims the benefit of and priority to U.S. Provisional Patent Application No. 62/085,314, filed on 27 Nov. 2014, both of which are incorporated by reference herein in their entirety for all purposes.

BACKGROUND

Field of the Invention

Embodiments described generally relate to emulsifier particles and methods for making and using same. More particularly, such embodiments relate to emulsifier particles made by subjecting an emulsifier solid to a mechanical attrition process. The emulsifier solid can include an alkali metal salt or an alkaline earth metal salt of a carboxylic acid terminated fatty amine condensate, an alkali metal salt or an alkaline earth metal salt of a modified tall oil, or a blend thereof.

Description of the Related Art

Drilling fluids or "drilling muds" are often utilized to "tap" subterranean deposits of natural resources in the oil and gas industries. The drilling fluids can be water-based drilling fluids or oil-based drilling fluids, and can be utilized to cool and/or lubricate drill bits, establish a fluid counter-pressure to prevent high-pressure formation fluids from entering wells prematurely, hinder the collapse of uncased wellbores, and/or remove drill cuttings from a wellbore by transporting the drill cuttings to the surface for separation. As global oil reserves continue to diminish, the focus of the drilling operations have shifted to areas or regions that were previously deemed unfavorable due to hostile drilling conditions, e.g., thermal and/or chemical instability. Oil-based drilling fluids, e.g., invert emulsion drilling fluids, can be utilized in these areas or regions, as they often exhibit relatively greater thermal and chemical stability as compared to water-based drilling fluids.

The invert emulsion drilling fluids include an oil phase (continuous phase) having aqueous droplets (dispersed phase) emulsified and/or dispersed therein. The oil phase can often include liquid hydrocarbons, e.g., diesel fuel, olefinic and/or paraffinic hydrocarbon species in the $C_{16}$-$C_{18}$ range, and the aqueous droplets can often include an aqueous solution, e.g., brine. The invert emulsion drilling fluids can be formed by blending the liquid hydrocarbon and the aqueous solution under high shear conditions and in the presence of an emulsifier capable of forming a stable dispersion of the aqueous droplets in the liquid hydrocarbon. Typically, the emulsifier is provided in the form of spray dried particles. While the spray dried emulsifier particles can be used to produce invert emulsion drilling fluids for drilling operations in a wide variety of formation types and wellbore conditions, the production of the spray dried emulsifier particles can often be cost prohibitive. For example, relatively large quantities of water are required to produce spray dried emulsifier particles and a large amount of energy is required to remove the water, which can be cost prohibitive.

There is a need, therefore, for improved emulsifier particles and methods for making and using same.

SUMMARY

Emulsifier particles and methods for making and using same are provided. In one or more embodiments, the emulsifier particles can include (1) an alkali metal salt or an alkaline earth metal salt of a carboxylic acid terminated fatty amine condensate, (2) an alkali metal salt or an alkaline earth metal salt of a modified tall oil, or (3) a blend of an alkali metal salt or an alkaline earth metal salt of a carboxylic acid terminated fatty amine condensate and an alkali metal salt or an alkaline earth metal salt of a modified tall oil. The emulsifier particles can have a BET specific surface area of about 0.3 $m^2$/g to about 1 $m^2$/g.

In one or more embodiments, the emulsifier particles can include a neutralized carboxylic acid terminated fatty amine condensate, a neutralized modified tall oil, or a blend thereof. The emulsifier particles can have a BET specific surface area of about 0.3 $m^2$/g to about 1 $m^2$/g. The emulsifier particles can have a BET pore volume of at least 0.001 $cm^3$/g to about 0.005 $cm^3$/g. The emulsifier particles can have a BET average pore width of about 50 angstroms to about 200 angstroms.

In one or more embodiments, a method for making emulsifier particles can include reducing a size of an emulsifier solid via a mechanical attrition process to produce emulsifier particles. The emulsifier solid can include (1) an alkali metal salt or an alkaline earth metal salt of a carboxylic acid terminated fatty amine condensate, (2) an alkali metal salt or an alkaline earth metal salt of a modified tall oil, or (3) a blend of an alkali metal salt or an alkaline earth metal salt of a carboxylic acid terminated fatty amine condensate and an alkali metal salt or an alkaline earth metal salt of a modified tall oil. The emulsifier particles can have a BET specific surface area of about 0.3 $m^2$/g to about 1 $m^2$/g.

DETAILED DESCRIPTION

Figure 1:
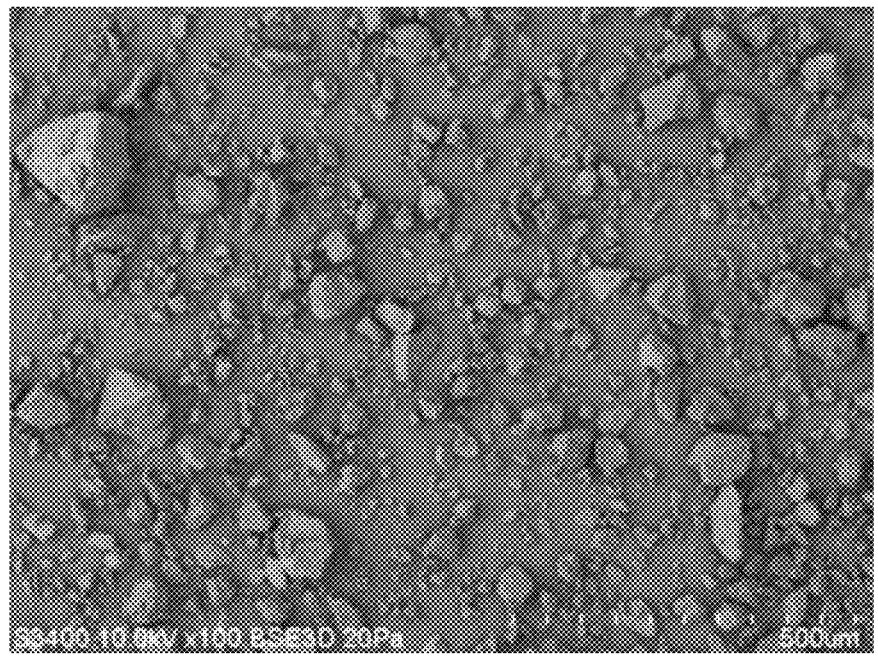
FIG. 1 is a scanning electron microscope image of emulsifier particles produced by mechanically grinding an emulsifier solid produced by removing water from an emulsified soap solution (Example 1).

A carboxylic acid terminated fatty amine condensate, a modified tall oil, or a mixture or blend of the carboxylic acid terminated fatty amine condensate and the modified tall oil can be neutralized to produce a neutralized composition or emulsifier. The neutralized emulsifier can be or include an alkali metal salt or an alkaline earth metal salt of the carboxylic acid terminated fatty amine condensate, an alkali metal salt or an alkaline earth metal salt of the modified tall oil, or a blend thereof. Water from the neutralized composition can be removed to produce an emulsifier solid. The emulsifier solid can be reduced in size via a mechanical process or a mechanical attrition process to produce an emulsifier particulate or emulsifier particles.

The emulsifier particles produced via the mechanical attrition process have significantly different physical properties as compared to emulsifier particles having the same composition, but produced via spray drying. For example, the emulsifier particles produced via the mechanical attrition process can have an increased chemical reactivity and/or a significantly improved wettability as compared to emulsifier particles produced via spray drying an aqueous mixture of the emulsifier. It has been surprisingly and unexpectedly discovered that the emulsifier particles produced via the mechanical attrition process can be used to make an emulsion, e.g., an invert emulsion, having significantly improved properties as compared to an emulsion made with the emulsifier particles having the same composition, but produced via spray drying. For example, invert emulsion drilling fluids produced with the emulsifier particles made via the mechanical attrition process can have significantly lower high temperature high pressure (HTHP) fluid loss values and/or significantly lower yield point (YP) values as compared to drilling fluids made with the emulsifier particles having the same composition, but produced via spray drying.

The emulsifier solid, prior to undergoing the mechanical attrition process to produce the emulsifier particles, can have any desired shape, size, and/or morphology. For example, the emulsifier solid can be in the form of flakes or pastilles of varying shapes and sizes. The size of the emulsifier solid can be reduced to produce the emulsifier particles using any desired mechanical attrition process or combination of mechanical attrition processes. Illustrative mechanical attrition processes can include, but are not limited to, grinding, milling, granulating, or any combination thereof. The mechanical attrition process can reduce the emulsifier solid into the emulsifier particles by grinding, crushing, and/or cutting the emulsifier solid. The mechanical attrition process can include, but is not limited to, media grinding or media milling or medialess grinding or medialess milling. Media grinding or media milling can include mixing balls, pebbles, or other media in a stirred mixture along with the emulsifier solid to be ground. The collisions of the media with the emulsifier solid can break or otherwise reduce the size of the emulsifier solid into the emulsifier particles.

Media milling or media grinding can include, but are not limited to, ball milling, bead milling, attritor milling, sand milling, horizontal milling, vertical milling, and vibratory milling. The media, which generally can be larger than the emulsifier solid to be ground, can be added to a chamber containing the emulsifier solid. The mixture can be stirred, rotated or otherwise agitated. The weight average particle size can be controlled or otherwise adjusted based, at least in part, on the particular media material, the size of the media material, the duration he emulsifier solid is subjected to the media milling or media grinding, and/or the energy applied to the process. Medialess milling or medialess grinding equipment can include, but is not limited to, jaw crushers, hammer mills, jet mills, and microfluidizers. Attrition of the emulsifier solid can be obtained via impact of the emulsifier solid on solid surfaces, through particle-particle collisions, and/or through rapid pressure changes resulting in the formation of cavities in the emulsifier solid. As such, suitable mechanical attrition processes can include, but are not limited to, grinding or milling with media, e.g., ball milling and attritor milling; grinding or milling without media, e.g., hammer milling, cryogenic hammer milling, jet milling, jaw crushing, high pressure dispersion milling, microfluidization, etc.; screening, or any combination thereof.

Mechanically reducing the size of the emulsifier solid can produce emulsifier particles having varying shapes. For example, the emulsifier particles produced via the mechanical attrition process can exhibit a wide and/or random range of particle structures having irregular and/or angular shapes. The emulsifier particles produced via the mechanical attrition process can be non-spherical.

The emulsifier particles can be quantified by measuring one or more properties thereof and one or more of these properties can be different than comparative emulsifier particles having the same composition, but produced via spray drying. For example, the emulsifier particles produced via the mechanical attrition process can have a greater specific surface area as compared to emulsifier particles produced via spray drying. The emulsifier particles produced via the mechanical attrition process can have a greater pore volume as compared to the emulsifier particles produced via spray drying. The emulsifier particles produced via the mechanical attrition process can have a smaller average pore width as compared to the emulsifier particles produced via spray drying. The emulsifier particles produced via the mechanical attrition process can have a smaller average Krumbein roundness as compared to the emulsifier particles produced via spray drying. The emulsifier particles produced via the mechanical attrition process can have a smaller average Krumbein sphericity as compared to the emulsifier particles produced via spray drying.

The specific surface area, pore volume, and average pore width of the emulsifier particles refers to the total specific surface area, total pore volume, and average pore width of the emulsifier particles as measured according to the Brunauer/Emmett/Teller or "BET" technique (described in S. Brunauer, P. H. Emmett, and E. Teller, J. Amer. Chem. Soc., 60, 309 (1938)). The BET technique employs nitrogen to measure the amount of gas adsorbed on a material and is commonly used in the art to determine the accessible surface area, pore volume, and average pore width of materials. The total pore volume can be measured by the single point adsorption method with nitrogen as the adsorbed molecule. The average pore width can also be measured by the BET technique (4V/A by BET). The total specific surface area, the total pore volume, and the average pore width can be measured with a TRISTAR II surface area and porosity analyzer (available from Micromeritics Instrument Corp., Norcross, Ga.). The total specific surface area, the total pore volume, and the average pore width values, when measured according to the BET technique, can be referred to as the BET specific surface area, the BET pore volume, and the BET average pore width, respectively.

The emulsifier particles produced from the mechanical attrition process can have a BET specific surface area of about 0.15 $m^2$/g, about 0.2 $m^2$/g, about 0.25 $m^2$/g, about 0.3 $m^2$/g, about 0.35 $m^2$/g, about 0.4 $m^2$/g, about 0.45 $m^2$/g, about 0.5 $m^2$/g, about 0.55 $m^2$/g, about 0.6 $m^2$/g, about 0.65 $m^2$/g, or about 0.7 $m^2$/g to about 0.75 $m^2$/g, about 0.8 $m^2$/g, about 0.85 $m^2$/g, about 0.9 $m^2$/g, about 0.95 $m^2$/g, about 1.0 $m^2$/g, about 1.05 $m^2$/g, about 1.1 $m^2$/g, about 1.15 $m^2$/g, about 1.2 $m^2$/g, about 1.25 $m^2$/g, about 1.3 $m^2$/g, or greater. In another example, the emulsifier particles can have a BET specific surface area of about 0.65 $m^2$/g, about 0.67 $m^2$/g, about 0.69 $m^2$/g, about 0.71 $m^2$/g, about 0.73 $m^2$/g, about 0.75 $m^2$/g, about 0.77 $m^2$/g, about 0.79 $m^2$/g, about 0.81 $m^2$/g, about 0.83 $m^2$/g, or about 0.85 $m^2$/g to about 0.89 $m^2$/g, about 0.91 $m^2$/g, about 0.93 $m^2$/g, about 0.95 $m^2$/g, about 0.97 $m^2$/g, about 0.99 $m^2$/g, about 1.01 $m^2$/g, about 1.03 $m^2$/g, about 1.05 $m^2$/g, about 1.07 $m^2$/g, about 1.09 $m^2$/g, or greater.

The emulsifier particles produced from the mechanical attrition process can have a BET pore volume of about 0.001 $cm^3$/g, about 0.0015 $cm^3$/g, about 0.002 $cm^3$/g, or about 0.0025 cm³/g to about 0.003 cm³/g, about 0.004 cm³/g, about 0.005 cm³/g, or about 0.006 cm³/g. For example, the emulsifier particles can have a BET pore volume of about 0.001 cm³/g to about 0.005 cm³/g, about 0.001 cm³/g to about 0.0025 cm³/g, about 0.002 cm³/g to about 0.004 cm³/g, or about 0.003 cm³/g to about 0.0045 cm³/g.

The emulsifier particles produced from the mechanical attrition process can have a BET average pore width of about 50 angstroms (Å), about 55 Å, about 60 Å, or about 65 Å to about 100 Å, about 120 Å, about 135 Å, or about 150 Å. For example, the emulsifier particles can have a BET average pore width of about 50 Å to about 75 Å, about 60 Å to about 70 Å, about 55 Å to about 125 Å, or about 60 Å to about 90 Å. In another example, the emulsifier particles can have a BET average pore width of about 50 Å, about 55 Å, or about 60 Å to less than 225 Å, less than 200 Å, less than 175 Å, less than 150 Å, less than 125 Å, or less than 100 Å.

The shape of the emulsifier particles can be quantified by a roundness and/or a sphericity or a degree of sphericity of the emulsifier particles. The roundness and sphericity of the emulsifier particles can be determined by an average Krumbein shape factor for roundness and an average Krumbein shape factor for sphericity. The Krumbein shape factor can be determined by visually comparing the emulsifier particles to standard silhouette profiles on the Krumbein roundness and sphericity chart (Krumbein, W. C., and Sloss, L. L., *Stratigraphy and Sedimentation,* 1956, Freeman and Company, San Francisco Calif.). The procedure outlined in the API RP 19C Standardized Test by American Petroleum Institute (May 2008) can be followed in determining the average Krumbein roundness and the average Krumbein sphericity. For example, a technician can visually observe at least 20 particles of a representative sample on a manual optical microscope and can subjectively assign a roundness and sphericity value to each particle by visually comparison of the particle to the images in the Krumbein chart. Alternatively or in addition to a technician visually analyzing a representative sample of particles, one can use a digital image analyzer that can assign roundness and sphericity values. In one example, a CAMSIZER Digital Image Processing Particle Size and Shape Analysis System that is commercially available from HORIBA Ltd. can be used to determine the Krumbein roundness and Krumbein sphericity values. In another example, a PartAn$^{3D}$ dynamic image analyzer that is commercially available from Microtrac can be used to determine the Krumbein roundness and Krumbein sphericity values.

In one example, the emulsifier particles can have an average Krumbein roundness of about 0.1, about 0.2, about 0.3, or about 0.4 to about 0.6, about 0.7, about 0.8, or about 0.9. In another example, the emulsifier particles can have an average Krumbein roundness of about 0.1 to about 0.7, about 0.3 to about 0.7, about 0.5 to about 0.7, about 0.1 to about 0.8, about 0.3 to about 0.8, about 0.5 to about 0.8, or about 0.6 to about 0.7. In another example, the emulsifier particles can have an average Krumbein roundness of less than 0.9, less than 0.8, less than 0.7, less than 0.6, less than 0.5, less than 0.4, less than 0.3, or less than 0.2. In another example, the emulsifier particles can have an average Krumbein roundness of greater than 0.1, greater than 0.2, or greater than 0.3 to less than 0.4, less than 0.6, less than 0.7, less than 0.8, or less than 0.9.

The emulsifier particles produced via the mechanical attrition process can be non-spherical. For example, the emulsifier particles can have an average Krumbein sphericity of about 0.1, about 0.2, about 0.3, or about 0.4 to about 0.6, about 0.7, about 0.8, or about 0.9. In another example, the emulsifier particles can have an average Krumbein sphericity of about 0.1 to about 0.7, about 0.3 to about 0.7, about 0.5 to about 0.7, about 0.1 to about 0.9, about 0.3 to about 0.9, about 0.5 to about 0.9, about 0.7 to about 0.9, about 0.1 to about 0.5, or about 0.3 to about 0.5. In another example, the emulsifier particles can have an average Krumbein sphericity of greater than 0.1, greater than 0.2, or greater than 0.3 to less than 0.4, less than 0.6, less than 0.7, less than 0.8, or less than 0.9.

The emulsifier particles produced via the mechanical attrition process can have a greater bulk density as compared to the spray dried emulsifier particles. Rapid evaporation or removal of liquids and/or solutions, such as water, during the spray drying process generally forms spray dried emulsifier particles having a porous or sponge-like morphology. The emulsifier particles produced via the mechanical attrition process can have a bulk density of about 0.2 g/cm³, about 0.25 g/cm³, about 0.3 g/cm³, about 0.35 g/cm³, about 0.4 g/cm³, about 0.45 g/cm³, about 0.5 g/cm³, about 0.55 g/cm³, or about 0.6 g/cm³ to about 0.65 g/cm³, about 0.7 g/cm3, about 0.75 g/cm³, about 0.8 g/cm³, about 0.85 g/cm³, about 0.9 g/cm³, or about 0.95 g/cm³.

The bulk density of the emulsifier particles can be determined according to the following procedure. A clean and dry 100 ml Vankel Model 10717 graduated cylinder can be placed onto a balance having +/−0.01 gram accuracy and the balance can be zeroed. The graduated cylinder can be filled to the 100 ml mark with the emulsifier particles by pouring the emulsifier particles into the graduated cylinder at a steady and continuous rate, without packing the emulsifier particles into the cylinder. The bulk density of the emulsifier particles can be determined by dividing the weight of the emulsifier particles by 100 ml.

The emulsifier particles produced via the mechanical attrition process can have a weight average particle size of about 1.5 μm, about 5 μm, about 8.5 μm, about 12 μm, about 15.5 μm, about 19 μm, about 22.5 μm, about 26 μm, about 29.5 μm, about 33 μm, about 36.5 μm, or about 40 μm to about 43.5 μm, about 47 μm, about 50.5 μm, about 54 μm, about 57.5 μm, about 61 μm, about 64.5 μm, about 68 μm, about 71.5 μm, about 75 μm, about 78.5 μm, about 81 μm, or greater. In another example, the emulsifier particles can have a weight average particle size of about 5 μm, about 10 μm, or about 15 μm to less than 30 μm, less than 27 μm, less than 26 μm, less than 25 μm, less than 24 μm, less than 23 μm, less than 22 μm, less than 21 μm, or less than 20 μm.

As is understood in the art, the weight average particle size refers to the particle diameter at which 50 wt % of the particles exceed and 50 wt % of the particles fall below. The weight average particle size can be measured, for example, using a light scattering particle size distribution analyzer, such as the LA-300 Laser Diffraction Particle Size Distribution Analyzer that is commercially available from Horiba Ltd. The weight average particle size can also be measured, for example with a sieve shaker, such as the RO-TAP® RX-29 sieve shaker, commercially available from W. S. Tyler Industrial Group.

The physical characteristics or properties, such as the shape, the particle size, and/or the surface area, of the emulsifier particles formed from the one or more mechanical attrition processes can provide the emulsifier particles with one or more desirable properties as compared to particles produced via spray drying an aqueous mixture of the emulsifier. For example, the bulk density of the emulsifier particles can increase the amount of emulsifier that can be packaged and shipped within a given container or package. In another example, the particle size and/or surface area of the emulsifier particles can increase a rate of dispersion and/or solubilization of the emulsifier particles in one or more liquids, solutions, or carriers, such as drilling fluids. The emulsifier particles can have substantially the same or less free water content as the emulsifier solid. The emulsifier particles can be free flowing and can be stored for extended periods in the absence of moisture, e.g., in vapor barrier containers and/or bags, without significant agglomeration of the emulsifier particles.

A carboxylic acid terminated fatty amine condensate, a modified tall oil, or a blend of the carboxylic acid terminated fatty amine condensate and the modified tall oil can be neutralized with one or more base compounds to produce the emulsifier. The carboxylic acid terminated fatty amine condensate can be or include a reaction product of one or more fatty acid amine condensates and one or more polycarboxylic acids, one or more carboxylic anhydrides, or a mixture of one or more polycarboxylic acids and one or more carboxylic anhydrides. The fatty acid amine condensate can be carboxylated with the polycarboxylic acid, the carboxylic anhydride, or a mixture thereof to provide a carboxylic acid terminated derivative. Suitable fatty acid amine condensates can include, but are not limited to, a reaction product of a polyamine and a fatty acid. The polyamine reacted with the fatty acid to produce the fatty acid amine condensate can include, but is not limited to, one or more compounds having the chemical formula (A).

$$H_2N[(CH_2)_xNH]_yH \qquad (A)$$

In the chemical formula (A), "x" and "y" can independently be an integer of 1 to about 10. Illustrative polyamines can include, but are not limited to, polyalkylene polyamines. Illustrative polyalkylene polyamines can include, but are not limited to, polyethylene polyamines. Illustrative polyethylene polyamines can include, but are not limited to diethylenetriamine, triethylenetetramine, tetraethylenepentamine, pentaethylenehexamine, or any mixture thereof. In at least one example, diethylenetriamine, triethylenetetramine, tetraethylenepentamine, and/or pentaethylenehexamine can be reacted with the fatty acid individually. In another example, a mixture of at least two of diethylenetriamine, triethylenetetramine, tetraethylenepentamine, and pentaethylenehexamine can be reacted with the fatty acid. Other examples of suitable polyamines can include, but are not limited to, methyl bis(3-aminopropyl)-amine, dipropylenetriamine, bis(hexamethylene)triamine, bis-2-hydroxyethyl ethylenediamine, aminoethyl piperazine, N-(2-aminoethyl)piperazine, N,N-bis(2-aminoethyl)-ethylenediamine, diaminoethyl triaminoethylamine, piperazinethyl triethylenetetramine, or any mixture thereof. Any one or more of the polyamines can be reacted with the fatty acid to produce the fatty acid amine condensate.

The fatty acids reacted with the polyamine to produce the fatty acid amine condensate can include, but are not limited to, alkanoic fatty acids and/or alkenoic fatty acids. For example, the fatty acids can include alkanoic fatty acids and/or alkenoic fatty acids having from about 8 carbon atoms to about 24 carbon atoms. Illustrative alkanoic fatty acids and/or alkenoic fatty acids can include, but are not limited to, lauric acid, myristic acid, palmitic acid, stearic acid, arachidic acid, behenic acid, oleic acid, linoleic acid, erucic acid, or any mixture thereof. In at least one example, a mixture of fatty acids or a source containing a mixture of fatty acids can be reacted with the polyamine to produce the fatty acid amine condensates. For example, a mixture of fatty acids can be obtained from the processing, e.g., refining, of a tall oil. As known in the art, tall oil refers to a resinous yellow-black, oily liquid obtained as an acidified byproduct in the kraft or sulfate processing of pine wood. Tall oil, prior to refining, includes a mixture of rosin acids, fatty acids, sterols, high-molecular weight alcohols, and other alkyl chain materials. Distillation of crude tall oil can be used to recover a mixture of fatty acids in the $C_{16}$-$C_{24}$ range. For example, commercially available tall oil products such as XTOL® 100, XTOL® 300, and XTOL® 304 (all available from Georgia-Pacific Chemicals LLC, Atlanta, Ga.) all contain saturated and unsaturated fatty acids in the $C_{16}$-$C_{24}$ range, as well as minor amounts of rosin acids. It should be appreciated by those skilled in the art that tall oil can be derived from various natural sources; and thus, the composition of the tall oil can vary among the various natural sources. Other fatty acids and mixtures of fatty acids including oxidized and/or dimerized tall oils, vegetable oils, e.g., soybean oil, tallow fatty acids, or the like, or any combination thereof, can also be reacted with the polyamines to produce the fatty acid amine condensates.

The fatty acid amine condensate can be prepared by heating a mixture of the polyalkylene polyamine and the fatty acid to a temperature of about 110° C., about 125° C., about 140° C., about 150° C., or about 155° C. to about 160° C., about 170° C., about 175° C., about 180° C., about 190° C., about 200° C., or about 250° C. The reaction time can depend, at least in part, on the temperature at which the mixture of the polyalkylene polyamine and the fatty acid is heated. For example, a lower reaction temperature can generally increase the reaction time. In one example, the condensation reaction between the polyalkylene polyamine and the fatty acid can proceed to substantial completion in generally about 0.5 hours to about 4 hours or about 1 hour to about 3 hours. The condensation reaction between the polyalkylene polyamine and the fatty acid can produce a fatty acid amidoamine. The condensation reaction between the polyalkylene polyamine and the fatty acid can produce water as a byproduct. The water produced from the condensation reaction can be distilled from the reaction mixture. Other suitable methods and/or reaction conditions, e.g., higher or lower reaction temperatures, can be utilized to prepare the fatty acid amine condensates, such as those discussed and described in U.S. Pat. No. 3,758,493. The fatty acid amine condensate can include a fatty acid amidoamine, a fatty acid imidazoline, such as a 1-aminoalkyl-2-alkyl-2-imidazoline, or a mixture thereof.

The fatty acid amine condensate can have unreacted primary amine groups. For example, a molar ratio of carboxylic acid groups from the fatty acids to primary amine groups from the polyalkylene polyamines can be at least partially determined by the extent to which terminal, unreacted primary amine groups from the polyalkylene polyamines can be retained in the resulting fatty acid amine condensate. In at least one example, the molar ratio of the carboxylic acid groups to the primary amine groups can be about 0.2:1, about 0.3:1, about 0.4:1, or about 0.5:1 to about 0.6:1, about 0.7:1, about 0.8:1, or about 0.9:1. In one example, the molar ratio of the carboxylic acid groups to the primary amine groups can be about 0.5:1, and each of the resulting fatty acid amine condensate, e.g., fatty acid amidoamine and/or fatty acid imidazoline, can have about one unreacted primary amine group. It should be appreciated that the carboxylic acid groups from the fatty acid can react with secondary amine groups from the polyalkylene polyamine; however, the reaction of the carboxylic acid groups with the primary amine groups can generally be more favorable. The reaction conditions can be controlled to increase the reactivity between the carboxylic acid groups and the primary amine groups and/or decrease the reactivity between the carboxylic acid groups and the secondary amine groups.

The polycarboxylic acid and/or the carboxylic anhydride can react with the terminal amine groups of the fatty acid amine condensate to produce the carboxylic acid terminated fatty amine condensate. For example, the polycarboxylic acid and/or the carboxylic anhydride can react with all or substantially all the terminal amine groups of the fatty acid amine condensate to produce the carboxylic acid terminated fatty amine condensate. The polycarboxylic acid reacted with the terminal amine group of the fatty acid amine condensate can be or include one or more dicarboxylic acids or diacids. Illustrative dicarboxylic acids can include, but are not limited to, glutaric acid; adipic acid; azelaic acid; malonic acid; suberic acid; sebacic acid; succinic acid; oxalic acid; pimelic acid; 2-methylsuccinic acid; undecanedioic acid; dodecandioic acid; 2-methylglutaric acid; 3,3-dimethylglutaric acid; acids of tricarboxypentane such as 4-carboxypimelic acid; alicyclic saturated acids such as 1,2-cyclohexanedicarboxylic acid, 1-3-cyclohexanedicarboxylic acid, 1,4-cyclohexanedicarboxylic acid, and 1-3-cyclopentanedicarboxylic acid; unsaturated aliphatic acids such as maleic acid, fumaric acid, itaconic acid, citraconic acid, mesaconic acid, aconitic acid, and hexane-3-diotic acid; unsaturated alicyclic acids such as 1,4-cyclohexenedicarboxylic acid; aromatic acids such as phthalic acid, isophtalic acid, terephthalic acid, 2,3-naphthalenedicarboxylic acid, and benzene-1,4-diacetic acid; and heteroaliphatic acids such as diglycolic acid, thiodiglycolic acid, dithiodiglycolic acid, iminodiacetic acid, and methyliminodiacetic acid; derivatives thereof; or any mixture thereof. Illustrative carboxylic anhydrides can include, but are not limited to, succinic anhydride, maleic anhydride, or a mixture thereof. For example, the carboxylic anhydride can be a maleic anhydride that can react with or convert the terminal amine groups of the fatty acid amine condensate to produce terminal carboxyl groups. The resulting carboxylic acid terminated fatty amine condensate prepared from the maleic anhydride and the fatty acid amine condensate can be a maleated reaction product, such as a maleated fatty acid amidoamine or "maleated amidoamine."

The carboxylic acid terminated fatty amine condensate can be prepared by condensing the polycarboxylic acid and/or the carboxylic anhydride with the fatty acid amine condensate. The condensation reaction between the fatty acid amine condensate and the polycarboxylic acid and/or the carboxylic anhydride can proceed at a temperature of about 20° C., about 25° C., about 30° C., about 40° C., about 50° C., or about 60° C. to about 70° C., about 80° C., about 90° C., about 95° C., or about 100° C. The reaction time between the fatty acid amine condensate and the polycarboxylic acid and/or the carboxylic anhydride can depend, at least in part, on one or more reaction conditions. For example, the reaction time can depend, at least in part, on the temperature at which the carboxylic acid terminated fatty amine condensate is prepared. Generally, increasing the temperature can decrease the reaction times. The reaction time can also depend, at least in part, on the reactivity of the polycarboxylic acid, the carboxylic anhydride, and/or the fatty acid amine condensate. For example, utilizing the carboxylic anhydride, which can generally be more reactive, in lieu of the polycarboxylic acid can increase the reaction times and/or decrease the necessary reaction temperature. In one example, the reaction time can be from about 0.5 hours to about 4 hours or about 1 hour to about 3 hours.

In at least one example, the reaction to form the carboxylic acid terminated fatty amine condensate can proceed prior to the reaction with the polycarboxylic acid and/or the carboxylic anhydride. For example, dilution of the initially formed fatty acid amine condensate with a minimum or minor amount of a liquid can form the carboxylic acid terminated fatty amine condensate prior to the reaction with the polycarboxylic acid and/or the carboxylic anhydride. In another example, the carboxylic acid terminated fatty amine condensate can be prepared by initially forming the fatty acid amine condensate via a condensation reaction between a mixture of the fatty acids, e.g., from tall oil, and the polyalkylene polyamine, and subsequently reacting or condensing the fatty acid amine condensate with the polycarboxylic acid and/or the carboxylic anhydride.

The amount of the fatty acids and/or the mixture of fatty acids used to produce the carboxylic acid terminated fatty amine condensate can widely vary. For example, the amount of the fatty acids and/or the mixture of fatty acids can be about 30 wt %, about 35 wt %, about 40 wt %, about 45 wt %, about 50 wt %, about 55 wt %, about 60 wt %, or about 65 wt % to about 70 wt %, about 75 wt %, about 80 wt %, about 85 wt %, about 90 wt %, or about 95 wt %, based on a total weight of the fatty acids and/or the mixture of fatty acids, the polyalkylene polyamines, and the polycarboxylic acids and/or the carboxylic anhydrides.

The amount of the polyalkylene polyamine used to produce the carboxylic acid terminated fatty amine condensate can widely vary. For example, the amount of the polyalkylene polyamines can be about 1 wt %, about 2 wt %, about 3 wt %, about 4 wt %, about 5 wt %, about 6 wt %, or about 10 wt % to about 12 wt %, about 14 wt %, about 16 wt %, about 18 wt %, about 20 wt %, about 22 wt %, or about 24 wt %, based on a total weight of the fatty acids and/or the mixture of fatty acids, the polyalkylene polyamines, and the polycarboxylic acids and/or the carboxylic anhydrides.

The amount of the polycarboxylic acid, the carboxylic anhydride, or a mixture of the polycarboxylic acid and the carboxylic anhydride used to produce the carboxylic acid terminated fatty amine condensate can widely vary. For example, the amount of the polycarboxylic acids, the carboxylic anhydrides, or a mixture thereof can be about 1 wt %, about 2 wt %, about 3 wt %, about 4 wt %, about 5 wt %, about 6 wt %, or about 10 wt % to about 12 wt %, about 14 wt %, about 16 wt %, about 18 wt %, about 20 wt %, about 22 wt %, or about 24 wt %, based on a total weight of the fatty acids and/or the mixture of fatty acids, the polyalkylene polyamines, and the polycarboxylic acids and/or the carboxylic anhydrides.

The solids content of the carboxylic acid terminated fatty amine condensate can widely vary. The solids content of the carboxylic acid terminated fatty amine condensate can be determined or measured before or after dilution. For example, the solids content of the carboxylic acid terminated fatty amine condensate can be determined from an as-synthesized carboxylic acid terminated fatty amine condensate. The as-synthesized carboxylic acid terminated fatty amine condensate can be the reaction product resulting from the condensation reaction between the fatty acid amine condensate and the polycarboxylic acid and/or the carboxylic anhydride. In another example, the solids content of the carboxylic acid terminated fatty amine condensate can be determined after dilution, suspension, and/or dispersion of the as-synthesized carboxylic acid terminated fatty amine condensate in an appropriate liquid or solution.

The carboxylic acid terminated fatty amine condensate can have or can be adjusted to have, a solids content of about 5 wt %, about 10 wt %, about 20 wt %, about 30 wt %, about 40 wt %, or about 50 wt % to about 60 wt %, about 70 wt %, about 80 wt %, about 90 wt %, or about 100 wt %. For example, the carboxylic acid terminated fatty amine condensate can have, or can be adjusted to have, a solids content from about 60 wt % to about 95 wt %, about 67 wt % to about 95 wt %, about 75 wt % to about 95 wt %, about 85 wt % to about 95 wt %, about 90 wt % to about 95 wt %, or about 90 wt % to about 93 wt %.

The carboxylic acid terminated fatty amine condensate can be liquid-free or substantially liquid-free. As used herein, the term "substantially liquid-free" can refer to the carboxylic acid terminated fatty amine condensate having less than 10 wt % of a liquid (greater than 90 wt % solids content), less than 9 wt % of a liquid (greater than 91 wt % solids content), less than 8 wt % of a liquid (greater than 92 wt % solids content), less than 7 wt % of a liquid (greater than 93 wt % solids content), less than 6 wt % of a liquid (greater than 94 wt % solids content), less than 5 wt % of a liquid (greater than 95 wt % solids content), less than 4 wt % of a liquid (greater than 96 wt % solids content), less than 3.5 wt % of a liquid (greater than 96.5 wt % solids content), less than 3 wt % of a liquid (greater than 97 wt % solids content), less than 2 wt % of a liquid (greater than 98 wt % solids content), less than 1 wt % of a liquid (greater than 99 wt % solids content), less than 0.5 wt % of a liquid (greater than 99.5 wt % solids content), less than 0.25 wt % of a liquid (greater than 99.75 wt % solids content), or less than 0.1 wt % of a liquid (greater than 99.9 wt % solids content).

The modified tall oil can be or include a reaction product of one or more tall oil distillates or components and one or more unsaturated polycarboxylic acids and/or one or more carboxylic anhydrides. Illustrative tall oil distillates or components can include, but are not limited to, fatty acids, rosin acids, or any mixture thereof. The refinement or fractionation of tall oil can provide saturated and unsaturated fatty acids in the $C_{16}$-$C_{24}$ range and fatty acid/rosin acid mixtures. The tall oil distillates or components can include, lighter, e.g., lower boiling point, or heavier, e.g., high boiling point, distillates or components, or those components having a broader or narrower boiling point range, and can be utilized in the reaction with the unsaturated polycarboxylic acid and/or the unsaturated carboxylic anhydride to prepare the modified tall oil. The tall oil distillates or components can also include mixtures of tall oil distillate fractions. The fatty acid/rosin acid mixtures can be in a predetermined or desired ratio and can be obtained in a single distillate fraction by adjusting or controlling fractionation conditions of the tall oil. Illustrative tall oil distillates or components can include, but are not limited to, commercially available tall oil products such as XTOL® 100, XTOL® 101, XTOL® 300, XTOL® 304, XTOL® 520, XTOL® 530, XTOL® 540, XTOL® 542, XTOL® 656, XTOL® 690, XTOL® 692, XTOL® MTO, LYTOR® 100, LYTOR® 105, LYTOR® 105K, LYTOR® 110, and LYTOR® 307, or any mixture thereof, and are available from Georgia-Pacific Chemicals LLC, Atlanta, Ga.

In one example, a mixture of tall oil distillate fractions can include a first tall oil distillate fraction that includes predominantly fatty acids, e.g., XTOL® 100, and a second tall oil distillate fraction that includes predominantly rosin acids, e.g., LYTOR® 100, blended or combined in any proportion or ratio. The amount of the fatty acids in the tall oil distillate fraction, either as recovered or in a mixture of two or more tall oil distillate fractions can be from about 45 wt %, about 50 wt %, about 55 wt %, about 60 wt %, or about 65 wt % to about 70 wt %, about 75 wt %, about 80 wt %, about 85 wt %, about 90 wt %. The amount of the rosin acids in the tall oil distillate fraction can be from about 10 wt %, about 15 wt %, about 20 wt %, about 25 wt %, or about 30 wt % to about 35 wt %, about 40 wt %, about 45 wt %, about 50 wt %, about 55 wt %. A mixture of two tall oil distillate fractions can also include the first tall oil distillate fraction and the second tall oil distillate fraction in any weight ratio with respect to one another. For example, the weight ratio of the first tall oil distillate fraction to the second tall oil distillate fraction can be from about 1.3:1, about 1.5:1, about 1.7:1, about 2:1, about 2.3:1, or about 2.5:1 to about 2.7:1, about 3:1, about 3.3:1, about 3.5:1, about 3.7:1, or about 4:1

The tall oil distillate fraction can be reacted with the unsaturated polycarboxylic acid and/or the carboxylic anhydride, e.g., maleic anhydride, to produce or form the modified tall oil. The amount of the unsaturated polycarboxylic acid and/or the carboxylic anhydride reacted with the mixture of the tall oil distillate fraction can widely vary. For example, the amount of the unsaturated polycarboxylic acid and/or the carboxylic anhydride can be from about 3 wt %, about 6 wt %, about 9 wt %, about 12 wt %, about 15 wt %, or about 18 wt % to about 21 wt %, about 24 wt %, about 27 wt %, about 30 wt %, about 33 wt %, or about 36 wt %, based on the combined weight of the tall oil distillate fraction and the unsaturated polycarboxylic acid and/or the carboxylic anhydride.

It should be appreciated that a single tall oil distillate fraction can have a composition similar or substantially similar to a mixture of the tall oil distillate fractions discussed and described herein. For example, the composition of the crude tall oil and/or the fractionation conditions can be selected and/or modified such that a single tall distillate fraction can have a composition similar or substantially similar to the mixture of the tall oil distillate fractions discussed herein.

The unsaturated polycarboxylic acids used to make the modified tall oil can include, but are not limited to, unsaturated dicarboxylic acids having about 4 carbon atoms to about 10 carbon atoms. Illustrative unsaturated dicarboxylic acids can include, but are not limited to, maleic acid, fumaric acid, phthalic acid, trans-2-hexenedioic acid, trans-3-hexenedioic acid, cis-3-octenedioic acid, cis-4-octenedioic acid, trans-3-octenedioic acid, succinic acid, or any mixture thereof. The carboxylic anhydrides can include, but are not limited to, maleic anhydride, succinic anhydride, or a mixture thereof.

The modified tall oil can be prepared by reacting the tall oil distillate and/or the mixture of tall oil distillate fractions, and the unsaturated polycarboxylic acid and/or the carboxylic anhydride at a temperature of about 110° C., about 125° C., about 140° C., about 150° C., or about 155° C. to about 160° C., about 170° C., about 175° C., about 180° C., about 190° C., about 200° C., or about 250° C. The reaction time can depend, at least in part, on the reaction temperature. For example, a lower reaction temperature can generally increase reaction times. In one example, the condensation reaction between the tall oil distillates and/or the mixture of the tall oil distillate fractions, and the unsaturated polycarboxylic acids and/or the carboxylic anhydrides can be substantially complete reacted with one another in generally about 10 hours to about 40 hours, about 12 hours to about 36 hours, about 15 hours to about 32 hours, or about 20 hours to about 30 hours.

Without wishing to be bound by theory, it is believed that the unsaturated polycarboxylic acid and/or the carboxylic anhydride can react with the tall oil distillates and/or the mixture of the tall oil distillate fractions at one or more sites of unsaturation (i.e., carbon-carbon double bonds). For example, the reaction between a maleic anhydride and an unsaturated tall oil fatty acid can result in the addition of the anhydride ring to the acid at olefinic sites via an "ene" reaction. In another example, a maleic anhydride and a rosin acid derived from tall oil can react with one another via a Diels-Alder reaction to form a reaction product having a 6-member ring with one site of unsaturation. The maleic anhydride can react at diolefinic sites of the rosin acid via the Diels-Alder reaction. The modified tall oil derived from the reaction between the maleic anhydride and the tall oil distillate having one or more tall oil distillate fractions can be referred to as a "maleated tall oil." The maleated tall oil can include maleated fatty acids and/or maleated rosin acids.

The modified tall oil can include oxidized tall oil, oxidized and maleated tall oil, or a mixture thereof. The oxidized tall oil can generally include dimerized tall oil fatty acids and reaction products having relatively higher molecular weights. The oxidized tall oil can be blown or air oxidized tall oil, or tall oil oxidized with oxygen, oxygen-enriched air, or the like. The modified tall oil can also be prepared by catalytic dimerization or polymerization of the tall oil fatty acids. The modified tall oil can include mixtures of a reaction product of the tall oil distillate component and the unsaturated polycarboxylic acid and/or the carboxylic anhydride, and the polymerized or dimerized tall oil, e.g., obtained via catalysis and/or oxidation.

The emulsifier solid, as discussed above, can be or include the carboxylic acid terminated fatty amine condensate, the modified tall oil, or a blend or mixture of the carboxylic acid terminated fatty amine condensate and the modified tall oil, where the carboxylic acid terminated fatty amine condensate, the modified tall oil, or the blend or mixture thereof can be neutralized. The polycarboxylic acid and the carboxylic anhydride utilized to prepare each component of the blend can be the same or different. For example, fumaric acid can be used to prepare the components of the blend. In another example, maleic anhydride can be used to prepare the components of the blend. The carboxylic acid terminated fatty amine condensate and the modified tall oil can be combined at varying weight ratios. For example, the weight ratio of the carboxylic acid terminated fatty amine condensate to the modified tall oil can be from about 1.3:1, about 1.5:1, about 1.7:1, about 2:1, about 2.3:1, or about 2.5:1 to about 2.7:1, about 3:1, about 3.3:1, about 3.5:1, about 3.7:1, or about 4:1.

The components used to prepare the emulsifier solid, including the carboxylic acid terminated fatty amine condensate; the modified tall oil, and/or the blend of the carboxylic acid terminated fatty amine condensate and the modified tall oil, can be acidic. For example, the components used to prepare the emulsifier can be acidic prior to neutralization. The acidity of the carboxylic acid terminated fatty amine condensate can be provided by the conversion of the terminal amine in the fatty acid amine condensate to the terminal carboxylic acid. The acidity of the modified tall oil can be provided by the addition of the unsaturated polycarboxylic acid and/or the carboxylic anhydride via the "ene" reaction, e.g., tall oil fatty acid, or via the Diels-Alder reaction, e.g., tall oil rosin acid.

As noted above, the carboxylic acid terminated fatty amine condensate, the modified tall oil, or a blend of the carboxylic acid terminated fatty amine condensate and the modified tall oil can be neutralized with one or more base compounds to produce the emulsifier. Illustrative base compounds that can neutralize the carboxylic acid terminated fatty amine condensate and/or the modified tall oil can include, but are not limited to, one or more alkali metal hydroxides, one or more alkali metal oxides, one or more alkaline earth metal hydroxides, one or more alkaline earth metal oxides, or any mixture thereof. For example, suitable bases can include, but are not limited to, the hydroxides and/or oxides of lithium, sodium, potassium, beryllium, magnesium, calcium, strontium, barium, or any mixture thereof. The neutralization of the components of the emulsifier via the addition of the base compound can convert the respective components to their corresponding alkali metal salts and/or alkaline earth metal salts, e.g., carboxylate salts. For example, the terminal carboxylic acids of the carboxylic acid terminated fatty amine condensates can react with the base to form terminal metal carboxylate groups, e.g., sodium carboxylate groups or potassium carboxylate groups.

The base compound can be provided in any form or state. For example, the base compound can be provided as a solid and/or a liquid, e.g., aqueous solution. The concentration or amount of the base compound in an aqueous solution can widely vary. For example, the amount of the base compound present in an aqueous solution can be about 20 wt %, about 25 wt %, about 30 wt %, about 35 wt %, about 40 wt %, or about 45 wt % to about 55 wt %, about 60 wt %, about 65 wt %, about 70 wt %, about 75 wt %, or about 80 wt %. In at least one example, the base compound can be an aqueous solution containing about 25 wt % to about 75 wt % of sodium hydroxide. In another example, the base can be an aqueous solution containing about 25 wt % to about 75 wt % of calcium hydroxide. Mixtures of two or more base compounds can be utilized in the neutralization reaction. For example, a mixture of the base compounds can be added to the components of the emulsifier solid simultaneously for simultaneous neutralization reactions. In another example, two or more bases can be added to the components in series for sequential neutralization reactions. In at least one example, all or substantially all of an acid value of the carboxylic acid terminated fatty amine condensate and/or the modified tall oil can be neutralized with an aqueous solution or mixture of sodium hydroxide and calcium hydroxide. The amount of the bases for the neutralization reaction can be determined by a stoichiometric determination and/or by direct analysis/monitoring of the acid value of the solution prior to and/or during the neutralization reaction. The acid value (mg KOH/g) can be measured according to ASTM D1980-87(1998).

The neutralization reaction can be performed at varying reaction temperatures. For example, the reaction temperature of the neutralization reaction can be about 50° C., about 55° C., about 60° C., about 65° C., about 70° C., or about 75° C. to about 80° C., about 85° C., about 90° C., about 95° C., about 100° C., or about 105° C. The base can be gradually added over a predetermined period of time to avoid a significant fluctuation or deviation in temperature due to the formation of heat from the neutralization reaction. The gradual addition of the base can also address the relatively low initial solubility of the carboxylic acid terminated fatty amine condensate and/or the modified tall oil prior to the neutralization or saponification. For example, the base can be added over a period of time from about 0.2 hours, about 0.5 hours, about 1 hour to about 1.5 hours, about 2.0 hours, or about 2.5 hours. The amount of base added can be at least the stoichiometric amount necessary for substantially complete neutralization. The neutralization reaction can provide a neutralized composition or emulsifier having a neutral pH or an alkaline pH. For example, the neutralized composition can have a pH of about 7, about 8, about 9, or about 10 to about 11, about 12, or about 13.

The neutralized composition from the neutralization reaction can be or include an aqueous composition or solution.

For example, the neutralized composition can be an aqueous dispersion or an aqueous solution that can include the salts of the carboxylic acid terminated fatty amine condensate, the modified tall oil, or the blend or mixture thereof. The amount of water contained in the neutralized composition can widely vary. For example, the free water content of the aqueous dispersion or the aqueous solution of the neutralized composition can be from about 5 wt %, about 10 wt %, about 15 wt %, about 20 wt %, about 25 wt %, about 30 wt %, or about 35 wt % to about 40 wt %, about 45 wt %, about 50 wt %, about 55 wt %, about 60 wt %, about 70 wt %, about 75 wt %, about 80 wt %, or about 85 wt %. In another example, the free water content of the aqueous dispersion or the aqueous solution of the neutralized composition can be about 40 wt % to about 60 wt %, about 45 wt % to about 55 wt %, about 48 wt % to about 52 wt %, or about 50 wt % to about 51.5 wt %.

The neutralized composition can be prepared without the addition of any added water or other liquid, e.g., any solvent. As such, the neutralized composition can have a water and/or other liquid content of less than 90 wt %, less than 85 wt %, less than 80 wt %, less than 75 wt %, less than 70 wt %, less than 65 wt %, less than 60 wt %, less than 55 wt %, less than 50 wt %, less than 45 wt %, less than 40 wt %, less than 35 wt %, less than 30 wt %, less than 25 wt %, less than 20 wt %, less than 15 wt %, less than 10 wt %, less than 5 wt %, less than 3 wt %, or less than 1 wt %. In at least one example, the neutralized composition can have a solids content of about 30 wt % or more, about 35 wt % or more, about 40 wt % or more, about 45 wt % or more, about 50 wt % or more, about 55 wt % or more, about 60 wt % or more, about 65 wt % or more, about 70 wt % or more, about 75 wt % or more, about 80 wt % or more, about 85 wt % or more, about 90 wt % or more, about 95 wt % or more, about 98 wt % or more, or about 100 wt %.

The neutralized composition or emulsifier can be or include an alkali metal salt or an alkaline earth metal salt of the carboxylic acid terminated fatty amine condensate, an alkali metal salt or an alkaline earth metal salt of the modified tall oil, or a mixture or blend of the alkali metal salt or the alkaline earth metal salt of the carboxylic acid terminated fatty amine condensate and the alkali metal salt or the alkaline earth metal salt of the modified tall oil. If the emulsifier includes the blend of the alkali metal salt or the alkaline earth metal salt of the carboxylic acid terminated fatty amine condensate and the alkali metal salt or the alkaline earth metal salt of the modified tall oil, the amount of the two components can widely vary. For example, when the emulsifier contains a blend of the alkali metal salt or the alkaline earth metal salt of the carboxylic acid terminated fatty amine condensate and the alkali metal salt or the alkaline earth metal salt of the modified tall oil, the emulsifier can include about 1 wt %, about 5 wt %, about 10 wt %, about 20 wt %, about 30 wt %, about 40 wt %, about 50 wt %, about 60 wt %, about 70 wt %, about 80 wt %, about 90 wt %, about 95 wt %, or about 99 wt % of the alkali metal salt or the alkaline earth metal salt of the carboxylic acid terminated fatty amine condensate, based on the combined solids weight of the alkali metal salt or the alkaline earth metal salt of the carboxylic acid terminated fatty amine condensate and the alkali metal salt or the alkaline earth metal salt of the modified tall oil.

If the neutralized composition or emulsifier includes one or more liquids, e.g., water and/or solvent, the neutralized composition can be processed to remove the liquid therefrom. For example, the neutralized composition can be distilled and/or heated to remove water therefrom. Distilling the neutralized composition can produce or form a molten mass or molten emulsifier that can be cooled to form the emulsifier solid. For example, the molten emulsifier can be contacted with the surface of a substrate having a temperature lower than the melting point of the molten emulsifier to thereby solidify the molten emulsifier on the surface and produce the emulsifier solid. In one example, the substrate can be a drum, such as a rotating drum of a drum flaker. The rotating drum can rotate through the molten emulsifier contained in a dip pan positioned below the drum, or the molten emulsifier can be disposed, e.g., spread, over the rotating drum with an applicator. Other means for applying the molten emulsifier to the rotating drum can also be possible and are well known to one having ordinary skill in the art. For example, the molten emulsifier can be dripped onto the rotating drum. In another example, the substrate can be a belt, such as a rotating belt flaker. The molten emulsifier can cool on the rotating drum or the rotating belt to produce the emulsifier solid, and the emulsifier solid can be subsequently removed therefrom by gravity and/or by a scraping device.

The emulsifier solid can include less than 20 wt % of liquid, less than 17 wt % of liquid, less than 15 wt % of liquid, less than 12 wt % of liquid, less than 10 wt % of liquid, less than 7 wt % of liquid, less than 5 wt % of liquid, less than 3 wt % of liquid, less than 2 wt % of liquid, less than 1 wt % of liquid, less than 0.7 wt % of liquid, less than 0.5 wt % of liquid, less than 0.3 wt % of liquid, or less than 0.1 wt % of liquid. In at least one example, the emulsifier solid can include less than 20 wt % of water, less than 17 wt % of water, less than 15 wt % of water, less than 12 wt % of water, less than 10 wt % of water, less than 7 wt % of water, less than 5 wt % of water, less than 3 wt % of water, less than 2 wt % of water, less than 1 wt % of water, less than 0.7 wt % of water, less than 0.5 wt % of water, less than 0.3 wt % of water, or less than 0.1 wt % of water. In at least one example, the emulsifier particles can be free or substantially free of any liquid, e.g., water.

The emulsifier particles can be used to prepare emulsions, e.g., invert emulsions. For example, the emulsifier particles can be used to prepare drilling fluids such as invert emulsion drilling fluids. The emulsions can be prepared by combining and/or emulsifying the emulsifier particles, an oil phase or component, and an aqueous phase or component. The emulsifier particles can be combined or dissolved in the oil component and/or the aqueous component before combining the oil component and the aqueous component with one another. For example, the emulsifier particles can be dissolved in the aqueous component and then the aqueous component containing the emulsifier particles can be combined with the oil component. In another example, the emulsifier particles can be dissolved in the oil component and then the oil component containing the emulsifier particles can be combined with the aqueous component.

The oil component of the emulsion can include one or more hydrocarbons. Suitable hydrocarbons can include from about 10 to about 40 carbon atoms, about 10 to about 30 carbon atoms, about 12 to about 24 carbon atoms, or about 14 to about 20 carbon atoms. Illustrative hydrocarbons can include, but are not limited to, diesel oil, kerosene, or any other hydrocarbons such as paraffins, iso-paraffins, olefins, iso-olefins, aromatics, naphthalenes, and/or other hydrocarbon mixtures including various products of crude oil refining. The aqueous component of the invert emulsion can include, but is not limited to, water or an aqueous salt solution such as a brine solution containing sodium chloride, potassium chloride, magnesium chloride, calcium chloride, or any mixture thereof. The amount of salt in the aqueous component, if present, can be from about 1 wt %, about 5 wt %, about 10 wt %, about 15 wt % or about 20 wt % to about 25 wt %, about 30 wt %, about 35 wt %, or about 40 wt % based on the weight of the aqueous phase. The aqueous salt solution can be a saturated salt solution. The salts in the aqueous component, if present, can increase a density of the invert emulsion drilling fluid, decrease swelling effects of aqueous matter on formation clays, and/or reduce hole or bore enlargement caused by the dissolution of water soluble formation components.

The concentration or amount of the emulsifier particles in the emulsion, e.g., an invert emulsion, can widely vary. For example, the amount of the emulsifier in the emulsion can be about 0.5 wt %, about 1 wt %, about 1.5 wt %, about 2 wt %, about 2.5 wt %, about 3 wt %, about 3.5 wt %, or about 4 wt % to about 5 wt %, about 6 wt %, about 7 wt %, about 8 wt %, about 9 wt %, about 10 wt %, about 12 wt %, or about 15 wt %, based on the combined weight of the oil component, the aqueous component, and the emulsifier.

The concentration or amount of the aqueous component used in the emulsion, e.g., an invert emulsion, can also vary widely. For example, the amount of the aqueous component present in the emulsion can be about 1 wt %, about 3 wt %, about 5 wt %, about 7 wt %, about 10 wt %, about 15 wt %, about 20 wt %, or about 25 wt % to about 30 wt %, about 35 wt %, about 40 wt %, about 45 wt %, about 50 wt %, about 55 wt %, or about 60 wt %, based on the combined weight of the oil component, the aqueous component, and the emulsifier.

The concentration or amount of the oil component contained in the emulsion, e.g., an invert emulsion, can also vary widely. For example, the amount of the oil component present in the emulsion can be about 5 wt %, about 10 wt %, about 15 wt %, about 20 wt %, about 25 wt %, about 30 wt %, about 40 wt %, or about 45 wt % to about 50 wt %, about 55 wt %, about 60 wt %, about 65 wt %, about 70 wt %, about 75 wt %, about 80 wt %, about 85 wt %, about 90 wt %, or about 95 wt %, based on the combined weight of the oil component, the aqueous component, and the emulsifier.

The emulsion can be formed or produced by subjecting the emulsifier particles, the oil component, and/or the aqueous component to shear conditions. For example, the emulsifier particles, the oil component, and the aqueous component can be subjected to high or low speed mixers or agitators, homogenizers, colloid mills, or any combination thereof to facilitate contact and/or mixing and form the invert emulsions. The shear conditions can be combined with elevated temperatures to increase dispersion. For example, the emulsion can be produced or formed at a temperature of about 25° C., about 30° C., about 40° C., or about 50° C. to about 60° C., about 70° C., about 80° C., or about 90° C.

The emulsion can contain one or more additives. The one or more additives can be combined with the emulsifier particles, the aqueous component, and/or the oil component. The additives can also be combined with the invert emulsion. Illustrative additives can include, but are not limited to, corrosion inhibitors, friction reducers, suspended solids such as clay and organoclay, weighting materials or agents, or any combination thereof. The weighting agents can include, but are not limited to, any high density material conventionally employed in drilling applications. For example, the weighting agents can include barites, whiting, calcined clay, or any mixture thereof. The additives contained in the invert emulsions can also include one or more fluid loss additives that can increase viscosity and prevent escape of fluids into permeable formations traversed by a well bore. Illustrative fluid loss additives can include, but are not limited to, a hydratable clay or clay-like material, asphalt, carbon black, or any other conventional additive for drilling fluids. For example, the fluid loss additives can include high quality clays such as bentonite, montmorillonite, and kaolinite. The fluid loss additives can also include hydrocarbon resins, such as those discussed in: THE CHEMISTRY OF ALKENES (Jacob Zabicky ed., Interscience Publishers) (1964); Rolf Mildenberg, Mechthild Zander, & Gerd Collin, HYDROCARBON RESINS (Wiley-VCH) (1997); and Kirk-Othmer, ENCYCLOPEDIA OF CHEMICAL TECHNOLOGY (Wiley-Interscience 5th ed.) (2007). The additives contained in the invert emulsions can also include, but are not limited to, filter loss agents, viscosifiers, wetting agents, stabilizers, gel strength and rheological control agents, or the like, or any mixture thereof.

One or more of the additives discussed and described herein can be combined with the emulsifier solid and/or the emulsifier particles. For example, the additive can be combined with the emulsifier solid prior to and/or during the mechanical attrition processes, e.g., grinding. In another example, the additive can be combined with the emulsifier solid and/or the emulsifier particles during and/or after the mechanical attrition processes. Combining the emulsifier solid and/or the emulsifier particles with the additives prior to, during, and/or after the mechanical attrition processes can provide the emulsifier particles with a uniform dispersion of the additive. Combining the emulsifier solid and/or the emulsifier particles with the additives prior to, during, and/or after the mechanical attrition processes can also reduce production or lead times for the emulsifier particles as compared to conventional production methods such as spray drying.

EXAMPLES

In order to provide a better understanding of the foregoing discussion, the following non-limiting examples are offered. Although the examples can be directed to specific embodiments, they are not to be viewed as limiting the invention in any specific respect.

A master batch of an emulsified soap was prepared according to the following procedure. Tall oil fatty acids (TOFA) were reacted with diethylenetriamine (DETA) to produce a fatty acid amine condensate. The fatty acid amine condensate was reacted with maleic anhydride to produce carboxylic acid terminated fatty amine condensate. The carboxylic acid terminated fatty amine condensate was dissolved into an alkaline solution using water and sodium hydroxide to make the emulsified soap. The emulsified soap had a solids content of about 49 wt % and a pH of about 11. A first sample of the master batch was processed to produce an emulsifier solid and a second sample of the master batch was processed to produce spray dried emulsifier particles.

In preparation of the emulsifier solid, about 1.5 kg of the emulsified soap solution was introduced into a 2L glass resin kettle equipped with a stirrer, a heating mantel, and condenser for distillation. Heat was slowly applied and the water was slowly distilled off with distillation continued until a temperature of about 170° C. was reached. At this point a vacuum was slowly applied until a vacuum of about 27 inches of mercury was obtained and the vacuum was held for about 30 minutes. The vacuum was released, the top of the kettle was removed, and the viscous emulsifier was removed and allowed to cool to room temperature to produce the emulsifier solid. The emulsifier solid had a water content of about 2 wt %. To make the emulsifier particles the emulsifier solid was introduced into a Bantam Micro Mill equipped with a herringbone pattern discharge screen. The powder recovered from the Bantam Micro Mill was collected and used to prepare the drilling fluids of Ex. 1 and Ex. 2, discussed below. The remainder of the emulsified soap solution was spray dried in a commercial production spray dryer. The spray dried emulsifier particles was collected and used to prepare the drilling fluids of CEx. 1 and CEx. 2, discussed below.

Figure 2:
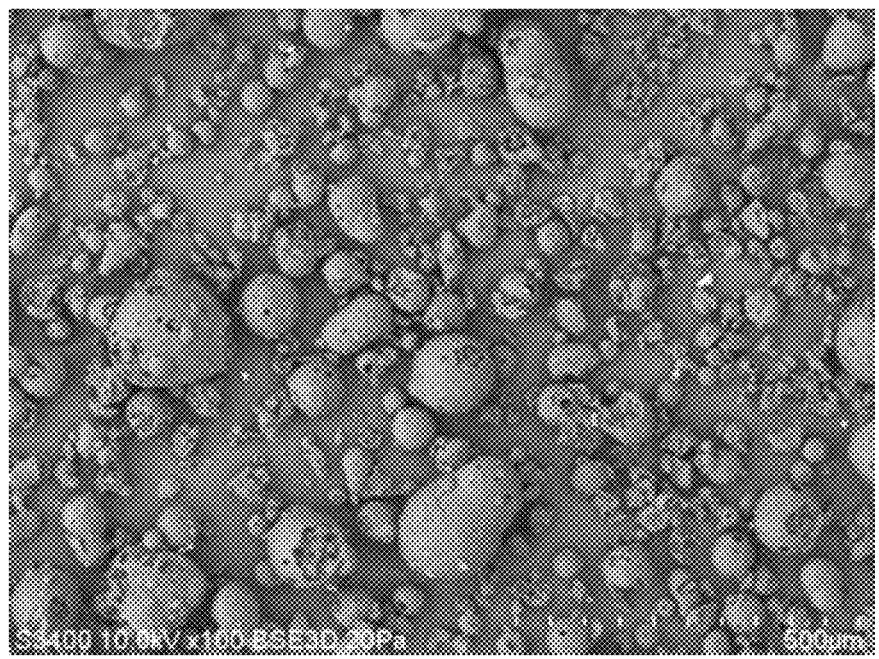
FIG. 2 is a scanning electron microscope image of emulsifier particles produced by spray drying the emulsified soap solution (Comparative Example 1).

FIG. 1 is a scanning electron microscope image of the emulsifier particles produced by mechanically grinding the emulsifier solid (Ex. 1 and Ex. 2). FIG. 2 is a scanning electron microscope image of the emulsifier particles produced by spray drying the emulsified soap solution (CEx. 1 and CEx. 2). Physical properties of the emulsifier particles produced by mechanically grinding (Ex. 1 and Ex. 2) and the emulsifier particles produced by spray drying the emulsified soap solution (CEx. 1 and CEx. 2) are shown in Table 1.

TABLE 1

Properties of the Emulsifier Particles

|  | Ex. 1 and Ex. 2 | CEx. 1 and CEx. 2 |
|---|---|---|
| BET Specific Surface Area (m²/g) | 0.8694 | 0.1967 |
| BET Pore Volume (cm³/g) | 0.001404 | 0.000859 |
| BET Average Pore Width (Å) | 64.60 | 251.25 |
| Average Krumbein Roundness | 0.7 | 0.9 |
| Average Krumbein Sphericity | 0.7 | 0.7 |
| Weight Average Particle Size (μm) | 24.0 | 27.5 |

The performance of the inventive and comparative emulsifier particles was evaluated in drilling fluids that were not contaminated with OCMA grade bentonite clay (Ex. 1 and CEx. 1) and drilling fluids that were contaminated with about 20 ppb of OCMA grade bentonite as a contaminant (Ex. 2 and CEx. 2). The comparative drilling fluids (CEx. 1 and CEx. 2) and the inventive drilling fluids (Ex. 1 and Ex. 2) included the following components: about 178 g of #2 Diesel, about 5 g of organophilic clay (bentonite), about 4 g of calcium hydroxide, about 5 g of the appropriate emulsifier, i.e., the emulsifier particles produced via the Bantam Micro Mill (Ex. 1 and Ex. 2) or the spray dried emulsifier particles (CEx. 1 and CEx. 2), about 71.5 g of a 25 wt % brine solution, about 272 g of barium sulfate (4.2 specific gravity), and for Ex. 2 and CEx. 2 about 20 g of OCMA grade bentonite. The OCMA grade bentonite was added to the drilling fluids of Ex. 2 and CEx. 2 to simulate drilling muds that contained rock and sediment cuttings.

The drilling fluids were prepared according to the following procedure. The #2 diesel and organophillic clay were added to a Hamilton Beach mixer and mixed for about 10 minutes. The calcium hydroxide was added and the mixture was mixed for about 5 minutes. The emulsifier was added and the mixture was mixed for about 5 minutes. The brine was added and the mixture was mixed for about 10 minutes. The barium sulfate was added and the mixture was mixed for about 5 minutes. The mixture was then sheared on a Silverson high shear mixer for about 5 minutes at about 6,000 rpm to produce the invert emulsions or drilling fluids.

The before hot roll (BHR) rheology, plastic viscosity (PV), yield point (YP), electrical stability (ES), ten second gel strength (10"), and ten minute gel strength (10') were measured for all examples. The drilling fluids were then hot rolled for 16 hours at 150° F. The after hot roll (AHR) rheology, plastic viscosity, yield point, electrical stability, ten second gel strength, and ten minute gel strength were also measured at a temperature of 40° F. and 150° F. All testing on the drilling fluids were conducted according to the API Recommended Practice Standard 13B-2, Third Edition, February 1998. Table 2 shows the results of the rheology tests of Ex. 1 and CEx. 1. Table 3 shows the results of the rheology tests of Ex. 2 and CEx. 2.

TABLE 2

Rheology Properties for Uncontaminated Drilling Muds

|  | CEx. 1 | | | Ex. 1 | | |
|---|---|---|---|---|---|---|
| Rheology | BHR 150° F. | AHR 40° F. | AHR 150° F. | BHR 150° F. | AHR 40° F. | AHR 150° F. |
| 600 rpm | 45 | 143 | 52 | 44 | 139 | 50 |
| 300 rpm | 26 | 82 | 31 | 25 | 77 | 29 |
| 200 rpm | 19 | 61 | 24 | 19 | 56 | 21 |
| 100 rpm | 13 | 39 | 17 | 13 | 34 | 15 |
| 6 rpm | 7 | 14 | 9 | 6 | 10 | 7 |
| 3 rpm | 6 | 12 | 9 | 5 | 9 | 6 |
| PV (cP) | 19 | 61 | 21 | 19 | 62 | 21 |
| YP (lb/100 ft²) | 7 | 21 | 10 | 6 | 15 | 8 |
| 10" Gel (lb/100 ft²) | 7 | 14 | 11 | 6 | 12 | 9 |
| 10' Gel (lb/100 ft²) | 8 | 19 | 17 | 8 | 18 | 14 |
| ES Temp | 150° F. |  | 150° F. | 150° F. |  | 150° F. |
| ES Value (V) | 698 |  | 1106 | 600 |  | 933 |
| HTHP Fluid Loss Temp |  |  | 250° F. |  |  | 250° F. |
| HTHP Fluid Loss Value (ml) |  |  | 11.8 |  |  | 7.8 |
| Water in Filtrate |  |  | 0 |  |  | 0 |

In looking at the AHR at 150° F. results, the drilling fluids of Ex. 1 and CEx. 1 had similar rheology profiles. The drilling fluid of Ex. 1, however, had a lower high temperature high pressure (HTHP) fluid loss, which means that less drilling fluid would leak out into the formation. The gel times (10" Gel and 10' Gel) for the drilling fluid of Ex. 1 were slightly less than the gel times for the drilling fluid of CEx. 1, but the reduction did not have a significant negative impact on drilling mud performance. The yield point (YP) value of the drilling fluid of Ex. 1 was lower than the yield point value of the drilling fluid of CEx. 1. A lower yield point means that that less force would be needed to start turning the drill string after being stopped for whatever reason. Reducing the yield point of a drilling fluid reduces the likelihood of a drill string breaking because the torque needed to resume drilling operations is less.

TABLE 3

Rheology Properties for Contaminated Drilling Muds

|  | CEx. 2 | | | Ex. 2 | | |
|---|---|---|---|---|---|---|
| Rheology | BHR 150° F. | AHR 40° F. | AHR 150° F. | BHR 150° F. | AHR 40° F. | AHR 150° F. |
| 600 rpm | 55 | 166 | 55 | 53 | 163 | 56 |
| 300 rpm | 33 | 95 | 30 | 32 | 90 | 30 |
| 200 rpm | 26 | 70 | 23 | 25 | 65 | 22 |
| 100 rpm | 18 | 44 | 16 | 18 | 38 | 14 |
| 6 rpm | 10 | 14 | 8 | 9 | 11 | 7 |
| 3 rpm | 9 | 13 | 8 | 9 | 10 | 6 |
| PV (cP) | 22 | 71 | 25 | 21 | 73 | 26 |
| YP (lb/100 ft²) | 11 | 24 | 5 | 11 | 17 | 4 |
| 10" Gel (lb/100 ft²) | 11 | 15 | 10 | 10 | 13 | 8 |

TABLE 3-continued

Rheology Properties for Contaminated Drilling Muds

| | CEx. 2 | | | Ex. 2 | | |
|---|---|---|---|---|---|---|
| Rheology | BHR 150° F. | AHR 40° F. | AHR 150° F. | BHR 150° F. | AHR 40° F. | AHR 150° F. |
| 10' Gel (lb/100 ft²) | 12 | 25 | 14 | 12 | 22 | 14 |
| ES Temp | 150° F. | | 150° F. | 150° F. | | 150° F. |
| ES Value (V) | 401 | | 603 | 417 | | 576 |
| HTHP Fluid Loss Temp | | | 250° F. | | | 250° F. |
| HTHP Fluid Loss Value (ml) | | | 16.4 | | | 9.4 |
| Water in Filtrate | | | 0 | | | 0 |

In looking at the AHR at 150° F., the drilling fluids of Ex. 2 and CEx. 2 had similar rheology profiles. The drilling fluid of Ex. 2 had a slightly lower 10" gel time and an equal 10" gel time, but the slightly lower 10" gel time did not have a significant impact on drilling mud performance. A significant difference between the drilling fluids of Ex. 2 and CEx. 2 was that the high temperature high pressure (HTHP) fluid loss was significantly less than the drilling fluid of CEx. 2. More particularly, the HTHP fluid loss value for the drilling fluid of Ex. 2 was only 9.4 ml, whereas the HTHP fluid loss value for the drilling fluid of CEx. 1 was 16.4 ml. It was surprising and unexpected to find that emulsifier particles produced by a mechanical attrition process would have such a significant impact on the HTHP fluid loss value as compared to compositionally equivalent emulsifier particles that were produced by spray drying.

Additionally, when the drilling fluids were made, it was observed that the emulsifier particles produced via the mechanical attrition process wetted the solids in the drilling fluids much faster and made a better looking drilling fluid. In application, dry emulsifier particles can be added at the mud pit and can be mixed by the action of the pumps that circulate the drilling fluid down the well and back up to the surface. As such, emulsifier particles that can wet the particles more quickly should translate to better working performance in the field with less than optimal mixing capabilities.

Embodiments of the present disclosure further relate to any one or more of the following paragraphs:

1. A method for making emulsifier particles for use in producing a water-in-oil drilling fluid emulsion, the method comprising reducing a size of an emulsifier solid via a mechanical process to produce emulsifier particles, wherein the emulsifier solid is produced by neutralizing a carboxylic acid terminated fatty amine condensate, a modified tall oil, or a blend of the carboxylic acid terminated fatty amine condensate and the modified tall oil to produce a neutralized composition, and removing a liquid from the neutralized composition.

2. A method for making emulsifier particles for use in producing a water-in-oil drilling fluid emulsion, comprising: neutralizing a carboxylic acid terminated fatty amine condensate, a modified tall oil, or a blend of the carboxylic acid terminated fatty amine condensate and the modified tall oil to produce a neutralized, aqueous composition; removing water from the neutralized, aqueous composition to produce an emulsifier solid having a water content of less than 5 wt %; and mechanically reducing the emulsifier solid to produce emulsifier particles.

3. A method for preparing an invert emulsion drilling fluid comprising emulsifying a mixture comprising an oil phase, an aqueous phase, and emulsifier particles, wherein: the emulsifier particles are produced by reducing a size of an emulsifier solid via a mechanical process, and the emulsifier solid is produced by neutralizing a carboxylic acid terminated fatty amine condensate, a modified tall oil, or a blend of the carboxylic acid terminated fatty amine condensate and the modified tall oil to produce a neutralized composition, and removing water from the neutralized composition.

4. A method for making emulsifier particles for use in producing a water-in-oil drilling fluid emulsion, comprising grinding an emulsifier solid to produce emulsifier particles, wherein the emulsifier solid is produced by neutralizing a carboxylic acid terminated fatty amine condensate, a modified tall oil, or a blend of the carboxylic acid terminated fatty amine condensate and the modified tall oil to produce a neutralized composition, and removing a liquid from the neutralized composition.

5. A method for making emulsifier particles for use in producing a water-in-oil drilling fluid emulsion, comprising milling an emulsifier solid to produce emulsifier particles, wherein the emulsifier solid is produced by neutralizing a carboxylic acid terminated fatty amine condensate, a modified tall oil, or a blend of the carboxylic acid terminated fatty amine condensate and the modified tall oil to produce a neutralized composition, and removing a liquid from the neutralized composition.

6. A method for making emulsifier particles for use in producing a water-in-oil drilling fluid emulsion, comprising reducing a size of an emulsifier solid via a mechanical process to produce emulsifier particles, wherein the emulsifier solid comprises a neutralized carboxylic acid terminated fatty amine condensate, a neutralized modified tall oil, or a blend thereof.

7. Emulsifier particles comprising an alkali metal salt or an alkaline earth metal salt of a carboxylic acid terminated fatty amine condensate, an alkali metal salt or an alkaline earth metal salt of a modified tall oil, or a blend of the alkali metal salt or the alkaline earth metal salt of the carboxylic acid terminated fatty amine condensate and the alkali metal salt or the alkaline earth metal salt of the modified tall oil, wherein the emulsifier particles have a Krumbein sphericity of less than 0.7, a Krumbein roundness of less than 0.5, a bulk density of about 0.4 g/cm³ to about 0.6 g/cm³, and a BET specific surface area of greater than 0.15 m²/g.

8. The method or emulsifier particles according to any one of paragraphs 1 to 7, wherein the emulsifier particles have an average particle size of about 5 μm to about 81 μm.

9. The method or emulsifier particles according to any one of paragraphs 1 to 7, wherein the emulsifier particles have an average particle size of about 5 μm to about 40 μm.

10. The method or emulsifier particles according to any one of paragraphs 1 to 7, wherein the emulsifier particles have an average particle size of less than 54 μm.

11. The method or emulsifier particles according to any one of paragraphs 1 to 7, wherein the emulsifier particles have an average particle size of less than 33 μm.

12. The method or emulsifier particles o according to any one of paragraphs 1 to 7, wherein the emulsifier particles have an average particle size of less than 26 μm.

13. The method according to any one of paragraphs 1 to 5 or 8 to 12, wherein removing the liquid or water from the neutralized composition to produce the emulsifier solid comprises distilling the neutralized composition to produce a molten emulsifier.

14. The method according to paragraph 13, wherein the molten emulsifier is cooled to produce the emulsifier solid, and wherein the emulsifier solid contains less than 3 wt % liquid, and wherein the liquid comprises water.

15. The method according to paragraph 13, wherein the molten emulsifier is cooled to produce the emulsifier solid, and wherein the emulsifier solid contains less than 10 wt % liquid, and wherein the liquid comprises water.

16. The method according to paragraph 13, wherein the molten emulsifier is cooled to produce the emulsifier solid, and wherein the emulsifier solid contains less than 5 wt % liquid, and wherein the liquid comprises water.

17. The method according to paragraph 13, wherein the molten emulsifier is cooled to produce the emulsifier solid, and wherein the emulsifier solid contains less than 3 wt % liquid, and wherein the liquid comprises water.

18. The method according to paragraph 13, wherein the molten emulsifier is cooled to produce the emulsifier solid, and wherein the emulsifier solid contains less than 0.5 wt % liquid, and wherein the liquid comprises water.

19. The method according to any one of paragraphs 14 to 18, wherein cooling the molten emulsifier to produce the emulsified solid comprises contacting the molten emulsifier with a substrate having a temperature less than a melting point of the molten emulsifier.

20. The method or emulsifier particles according to any one of paragraphs 1 to 19, wherein the emulsifier particles have a BET specific surface area of greater than 0.15 m$^2$/g.

21. The method or emulsifier particles according to any one of paragraphs 1 to 20, wherein the emulsifier particles have a BET specific surface area of greater than 0.45 m$^2$/g.

22. The method or emulsifier particles according to any one of paragraphs 1 to 21, wherein the emulsifier particles have a BET specific surface area of greater than 0.65 m$^2$/g.

23. The method or emulsifier particles according to any one of paragraphs 1 to 22, wherein the emulsifier particles have a BET specific surface area of greater than 0.8 m$^2$/g.

24. The method or emulsifier particles according to any one of paragraphs 1 to 23, wherein the mechanical process comprises grinding, milling, or a combination of grinding and milling.

25. The method or emulsifier particles according to any one of paragraphs 1 to 24, wherein the emulsifier particles have a bulk density of about 0.4 g/cm$^3$ to about 0.6 g/cm$^3$.

26. The method or emulsifier particles of any one of paragraphs 1 to 25, wherein the emulsifier particles have a bulk density of greater than 0.45 g/cm$^3$.

27. The method or emulsifier particles according to any one of paragraphs 1 to 26, wherein the emulsifier particles have a bulk density of greater than 0.65 g/cm$^3$.

28. The method or emulsifier particles according to any one of paragraphs 1 to 27, wherein the emulsifier particles have a bulk density of greater than 0.75 g/cm$^3$.

29. The method or emulsifier particles according to any one of paragraphs 1 to 28, wherein the emulsifier particles have a bulk density of greater than 0.85 g/cm$^3$.

30. The method or emulsifier particles according to any one of paragraphs 1 to 29, wherein the emulsifier particles have a Krumbein roundness of less than 0.5.

31. The method or emulsifier particles according to any one of paragraphs 1 to 30, wherein the emulsifier particles have a Krumbein roundness of less than 0.3.

32. The method or emulsifier particles according to any one of paragraphs 1 to 31, wherein the emulsifier particles have a Krumbein roundness of less than 0.1.

33. The method or emulsifier particles according to any one of paragraphs 1 to 32, wherein the emulsifier particles have a Krumbein sphericity of less than 0.7.

34. The method or emulsifier particles according to any one of paragraphs 1 to 33, wherein the emulsifier particles have a Krumbein sphericity of less than 0.5.

35. The method or emulsifier particles according to any one of paragraphs 1 to 34, wherein the emulsifier particles have a Krumbein sphericity of less than 0.3.

36. The method or emulsifier particles according to any one of paragraphs 1 to 35, wherein the emulsifier particles have an average particle size of about 5 μm to about 81 μm, a BET specific surface area of greater than 0.15 m$^2$/g, a bulk density of about 0.4 g/cm$^3$ to about 0.6 g/cm$^3$, a Krumbein roundness of less than 0.5, and a Krumbein sphericity of less than 0.7.

37. The method or emulsifier particles according to any one of paragraphs 1 to 34, wherein the emulsifier particles have an average particle size of less than 54 μm, a BET specific surface area of greater than 0.45 m$^2$/g, a bulk density of greater than 0.45 g/cm$^3$, a Krumbein roundness of less than 0.3, and a Krumbein sphericity of less than 0.5.

38. The method or emulsifier particles according to any one of paragraphs 1 to 37, wherein the emulsifier particles have an average particle size of less than 33 μm, a BET specific surface area of greater than 0.65 m$^2$/g, a bulk density of greater than 0.75 g/cm$^3$, a Krumbein roundness of less than 0.3, and a Krumbein sphericity of less than 0.5.

39. The method or emulsifier particles according to any one of paragraphs 1 to 38, wherein the emulsifier particles have an average particle size of less than 26 μm, a BET specific surface area of greater than 0.8 m$^2$/g, a bulk density of greater than 0.85 g/cm$^3$, a Krumbein roundness of less than 0.3, and a Krumbein sphericity of less than 0.5.

40. The method or emulsifier particles according to any one of paragraphs 1 to 39, the modified tall oil is produced by reacting a tall oil distillate component with an unsaturated polycarboxylic acid or a carboxylic anhydride 41. The method or emulsifier particles according to any one of paragraphs 1 to 40, wherein the modified tall oil is produced by reacting a tall oil distillate component with maleic anhydride.

42. The method or emulsifier particles according to any one of paragraphs 1 to 41, wherein the carboxylic acid terminated fatty amine condensate, the modified tall oil, or the blend of the carboxylic acid terminated fatty amine condensate and the modified tall oil is neutralized at a temperature of about 50° C. to about 100° C.

43. The method or emulsifier particles according to any one of paragraphs 1 to 42, wherein the neutralized composition has a solids content of at least 40 wt %.

44. The method or emulsifier particles according to any one of paragraphs 1 to 43, wherein neutralizing the carboxylic acid terminated fatty amine condensate, the modified tall oil, or the blend of the carboxylic acid terminated fatty amine condensate and the modified tall oil to produce the neutralized composition comprises adding a base comprising an alkali metal hydroxide, an alkaline earth metal hydroxide, an alkali metal oxide, an alkaline earth metal oxide, or any mixtures thereof.

45. The method or emulsifier particles according to paragraph 44, wherein the base comprises lithium hydroxide, sodium hydroxide, potassium hydroxide, magnesium hydroxide, calcium hydroxide, barium hydroxide, or any mixture thereof.

46. The method or emulsifier particles according to paragraph 44 or 45, wherein the base comprises a mixture of sodium hydroxide and calcium hydroxide.

47. The method or emulsifier particles according to any one of paragraphs 1 to 46, wherein the emulsifier particles have an average particle size of about 5 μm to about 81 μm and a BET specific surface area of greater than 0.40 m$^2$/g.

48. The method or emulsifier particles according to any one of paragraphs 1 to 47, wherein the emulsifier particles have an average particle size of about 5μm to about 40 μm, a Brunauer/Emmett/Teller (BET) specific surface area of greater than 0.45 m$^2$/g, and a bulk density of greater than 0.75 g/cm$^3$.

49. The method or emulsifier particles according to any one of paragraphs 1 to 48, wherein the neutralized modified tall oil is produced by adding a base to a modified tall oil, the base comprising an alkali metal hydroxide, an alkaline earth metal hydroxide, an alkali metal oxide, an alkaline earth metal oxide, or any mixture thereof.

50. The method or emulsifier particles according to paragraph 49, wherein the modified tall oil is produced by reacting a tall oil distillate component with an unsaturated polycarboxylic acid, an unsaturated carboxylic anhydride, or a mixture of an unsaturated polycarboxylic acid and a carboxylic anhydride.

51. The method or emulsifier particles according to paragraph 49, wherein the modified tall oil is produced by reacting a tall oil distillate component with maleic anhydride.

52. Emulsifier particles, comprising: (1) an alkali metal salt or an alkaline earth metal salt of a carboxylic acid terminated fatty amine condensate, (2) an alkali metal salt or an alkaline earth metal salt of a modified tall oil, or (3) a blend of an alkali metal salt or an alkaline earth metal salt of a carboxylic acid terminated fatty amine condensate and an alkali metal salt or an alkaline earth metal salt of a modified tall oil, wherein the emulsifier particles have a BET specific surface area of about 0.3 m$^2$/g to about 1 m$^2$/g.

53. The emulsifier particles according to paragraph 52, wherein the emulsifier particles have a BET pore volume of at least 0.001 cm$^3$/g to about 0.005 cm$^3$/g.

54. The emulsifier particles according to paragraph 52 or 53, wherein the emulsifier particles have a BET specific surface area of at least 0.5 m$^2$/g to about 1 m$^2$/g.

55. The emulsifier particles according to any one of paragraphs 52 to 54, wherein the emulsifier particles have a bulk density of about 0.3 g/cm$^3$ to about 0.6 g/cm$^3$.

56. The emulsifier particles according to any one of paragraphs 52 to 55, wherein the emulsifier particles have a Krumbein roundness of 0.1 to less than 0.8 and a Krumbein sphericity of 0.1 to less than 0.8.

57. The emulsifier particles according to any one of paragraphs 52 to 56, wherein the emulsifier particles have a weight average particle size of about 5 μm to less than 80 μm.

58. The emulsifier particles according to any one of paragraphs 52 to 57, wherein the emulsifier particles have a BET pore volume of at least 0.0012 cm$^3$/g to about 0.002 cm$^3$/g.

59. The emulsifier particles according to any one of paragraphs 52 to 58, wherein the emulsifier particles have a BET average pore width of about 50 angstroms to about 150 angstroms.

60. The emulsifier particles according to any one of paragraphs 52 to 59, wherein the emulsifier particles have a BET specific surface area of about 0.5 m$^2$/g to about 1 m$^2$/g, a BET pore volume of at least 0.0012 cm$^3$/g to about 0.002 cm$^3$/g, and a BET average pore width of about 50 angstroms to about 150 angstroms.

61. The emulsifier particles according to any one of paragraphs 52 to 60, wherein the emulsifier particles have a BET specific surface area of at least 0.5 m$^2$/g to about 1 m$^2$/g, a BET pore volume of at least 0.0012 cm$^3$/g to about 0.002 cm$^3$/g, a BET average pore width of about 50 angstroms to less than 100 angstroms, a weight average particle size of about 5 μm to less than 27 μm, an average Krumbein roundness of 0.1 to 0.7, and a bulk density of about 0.3 g/cm$^3$ to about 0.6 g/cm$^3$.

62. The emulsifier particles according to any one of paragraphs 52 to 61, wherein: the emulsifier particles comprise the alkali metal salt or the alkaline earth metal salt of the modified tall oil.

63. The emulsifier particles according to paragraph 62, wherein the alkali metal salt or the alkaline earth metal salt of the modified tall oil is produced by adding an alkali metal hydroxide, an alkaline earth metal hydroxide, an alkali metal oxide, an alkaline earth metal oxide, or any mixture thereof to a modified tall oil.

64. The emulsifier particles according to paragraph 63, wherein the modified tall oil comprises a reaction product of a tall oil distillate component and an unsaturated polycarboxylic acid, a carboxylic anhydride, or a mixture of an unsaturated polycarboxylic acid and a carboxylic anhydride.

65. The emulsifier particles according to paragraph 64, wherein the tall oil distillate component comprises tall oil fatty acids, tall oil rosin acids, or a mixture thereof.

66. The emulsifier particles according to paragraph 64 or 65, wherein the unsaturated polycarboxylic acid comprises maleic acid, fumaric acid, phthalic acid, trans-2-hexenedioic acid, trans-3-hexenedioic acid, cis-3-octenedioic acid, cis-4-octenedioic acid, trans-3-octenedioic acid, succinic acid, or any mixture thereof.

67. The emulsifier particles according to any one of paragraphs 64 to 66, wherein the carboxylic anhydride comprises maleic anhydride, succinic anhydride, or a mixture thereof.

68. The emulsifier particles according to any one of paragraphs 52 to 67, wherein: the emulsifier particles comprise the alkali metal salt or the alkaline earth metal salt of the carboxylic acid terminated fatty amine condensate.

69. The emulsifier particles according to paragraph 68, wherein the alkali metal salt or the alkaline earth metal salt of the carboxylic acid terminated fatty amine condensate is produced by adding an alkali metal hydroxide, an alkaline earth metal hydroxide, an alkali metal oxide, an alkaline earth metal oxide, or any mixture thereof to a carboxylic acid terminated fatty amine condensate.

70. The emulsifier particles according to paragraph 69, wherein the carboxylic acid terminated fatty amine condensate comprises a reaction product of a fatty acid amine condensate and a polycarboxylic acid, a carboxylic anhydride, or a mixture of a polycarboxylic acid and a carboxylic anhydride.

71. The emulsifier particles according to any one of paragraphs 52 to 70, wherein the emulsifier particles have at least one of: a BET specific surface area of at least 0.6 m$^2$/g, a BET pore volume of at least 0.0013 cm$^3$/g, a BET average pore width of less than 100 angstroms, a weight average particle size of less than 27 μm, an average Krumbein roundness of less than 0.8, and a bulk density of about 0.4 g/cm$^3$ to about 0.6 g/cm$^3$.

72. Emulsifier particles, comprising a neutralized carboxylic acid terminated fatty amine condensate, a neutralized modified tall oil, or a blend thereof, wherein the emulsifier particles have a BET specific surface area of about 0.3 $m^2/g$ to about 1 $m^2/g$, a BET pore volume of at least 0.001 $cm^3/g$ to about 0.005 $cm^3/g$, and a BET average pore width of about 50 angstroms to about 200 angstroms.

73. The emulsifier particles according to paragraph 72, wherein the emulsifier particles comprise the neutralized carboxylic acid terminated fatty amine condensate.

74. The emulsifier particles according to paragraph 73, wherein the neutralized carboxylic acid terminated fatty amine condensate comprises an alkali metal salt or an alkaline earth metal salt of a carboxylic acid terminated fatty amine condensate.

75. The emulsifier particles according to any one of paragraphs 72 to 74, wherein the emulsifier particles comprise the neutralized modified tall oil.

76. The emulsifier particles according to paragraph 75, wherein the neutralized modified tall oil comprises an alkali metal salt or an alkaline earth metal salt of a modified tall oil.

77. The emulsifier particles according to paragraph 76, wherein the alkali metal salt or the alkaline earth metal salt of the modified tall oil is produced by adding an alkali metal hydroxide, an alkaline earth metal hydroxide, an alkali metal oxide, an alkaline earth metal oxide, or any mixture thereof to a modified tall oil.

78. The emulsifier particles according to paragraph 77, wherein the modified tall oil comprises a reaction product of a tall oil distillate component and an unsaturated polycarboxylic acid, a carboxylic anhydride, or a mixture of an unsaturated polycarboxylic acid and a carboxylic anhydride.

79. A method for making emulsifier particles, comprising reducing a size of an emulsifier solid via a mechanical attrition process to produce emulsifier particles, wherein the emulsifier solid comprises: (1) an alkali metal salt or an alkaline earth metal salt of a carboxylic acid terminated fatty amine condensate, (2) an alkali metal salt or an alkaline earth metal salt of a modified tall oil, or (3) a blend of an alkali metal salt or an alkaline earth metal salt of a carboxylic acid terminated fatty amine condensate and an alkali metal salt or an alkaline earth metal salt of a modified tall oil, and wherein the emulsifier particles have a BET specific surface area of about 0.3 $m^2/g$ to about 1 $m^2/g$.

80. The method according to paragraph 79, wherein the emulsifier particles have a BET specific surface area of at least 0.5 $m^2/g$ to about 1 $m^2/g$.

81. The method according to paragraph 79 or 80, wherein the emulsifier particles have a BET pore volume of at least 0.0012 $cm^3/g$ to about 0.003 $cm^3/g$.

82. The method according to any one of paragraphs 79 to 81, wherein the emulsifier particles have a BET average pore width of about 50 angstroms to about 150 angstroms.

83. The method according to any one of paragraphs 79 to 82, wherein the emulsifier particles have a Krumbein roundness of 0.1 to less than 0.8.

84. The method according to any one of paragraphs 79 to 83, wherein the emulsifier particles have a Krumbein sphericity of 0.1 to less than 0.8.

85. The method according to any one of paragraphs 79 to 84, wherein the emulsifier particles have a bulk density of about 0.3 $g/cm^3$ to about 0.6 $g/cm^3$.

86. The method according to any one of paragraphs 79 to 85, wherein the emulsifier particles have a BET pore volume of at least 0.0012 $cm^3/g$ to about 0.002 $cm^3/g$.

87. The method according to any one of paragraphs 79 to 86, wherein the emulsifier particles have a BET average pore width of about 50 angstroms to less than 100 angstroms.

88. The method according to any one of paragraphs 79 to 87, further comprising neutralizing a carboxylic acid terminated fatty amine condensate, a modified tall oil, or a blend thereof to produce a neutralized, aqueous composition; and removing water from the neutralized, aqueous composition to produce the emulsifier solid, wherein the emulsifier solid has a water content of less than 5 wt %.

89. The method according to any one of paragraphs 79 to 88, wherein the mechanical attrition process comprises grinding the emulsifier solid to produce the emulsifier particles.

90. The method according to any one of paragraphs 79 to 89, wherein the mechanical attrition process comprises milling the emulsifier solid to produce the emulsifier particles.

91. The method according to any one of paragraphs 79 to 88, wherein the mechanical attrition process comprises grinding the emulsifier solid to produce the emulsifier particles, wherein the emulsifier solid is ground with media.

92. The method according to any one of paragraphs 79 to 88, wherein the mechanical attrition process comprises grinding the emulsifier solid to produce the emulsifier particles, wherein the emulsifier solid is ground without media.

93. The method according to any one of paragraphs 79 to 89, wherein the mechanical attrition process comprises milling the emulsifier solid to produce the emulsifier particles, and wherein the milling comprises hammer milling, cryogenic hammer milling, jet milling, jaw crushing, high pressure dispersion milling, or any combination thereof.

94. A method for making an emulsion, comprising: mixing an oil component, an aqueous component, and emulsifier particles to produce an emulsion, wherein the emulsifier particles comprise: (1) an alkali metal salt or an alkaline earth metal salt of a carboxylic acid terminated fatty amine condensate, (2) an alkali metal salt or an alkaline earth metal salt of a modified tall oil, or (3) a blend of an alkali metal salt or an alkaline earth metal salt of a carboxylic acid terminated fatty amine condensate and an alkali metal salt or an alkaline earth metal salt of a modified tall oil, wherein the emulsifier particles have a BET specific surface area of about 0.3 $m^2/g$ to about 1 $m^2/g$.

95. The method according to paragraph 94, wherein the emulsion comprises about 50 wt % to about 95 wt % of the oil component, about 5 wt % to about 60 wt % of the aqueous component, and about 1 wt % to about 15 wt % of the emulsifier, based on the combined weight of the oil component, the aqueous component, and the emulsifier.

96. The method according to paragraph 94 or 95, wherein the oil component comprises one or more hydrocarbons having about 10 carbon atoms to about 40 carbon atoms.

97. The method according to any one of paragraphs 94 to 96, wherein the aqueous component is a brine solution comprising a salt selected from the group consisting of sodium chloride, potassium chloride, magnesium chloride, calcium chloride, or any mixture thereof.

98. The method according to any one of paragraphs 94 to 97, wherein the emulsion comprises a continuous phase and a dispersed phase.

99. The method according to paragraph 98, wherein the continuous phase comprises the oil component and the dispersed phase comprises the water component.

100. The method according to any one of paragraphs 94 to 99, wherein the emulsifier particles have at least one of: a BET specific surface area of at least 0.5 $m^2/g$, a BET pore volume of at least 0.0013 $cm^3/g$ to about 0.005 $cm^3/g$, a BET average pore width of about 50 angstroms to less than 100 angstroms, a weight average particle size of about 5 μm to less than 80 µm, an average Krumbein roundness of less than 0.8, an average Krumbein sphericity of less than 8, and a bulk density of about 0.4 g/cm$^3$ to about 0.6 g/cm$^3$.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments, other and further embodiments of the invention can be devised without departing from the basic scope thereof, and the scope thereof is determined by the claims that follow.

What is claimed is:

1. A method for making emulsifier particles, the method comprising
   distilling a liquid composition to produce a molten emulsifier, wherein the liquid composition comprises (1) an alkali metal salt or an alkaline earth metal salt of a carboxylic acid terminated fatty amine condensate, (2) an alkali metal salt or an alkaline earth metal salt of a modified tall oil, or (3) a blend of an alkali metal salt or an alkaline earth metal salt of a carboxylic acid terminated fatty amine condensate and an alkali metal salt or an alkaline earth metal salt of a modified tall oil;
   cooling the molten emulsifier to produce an emulsifier solid; and
   reducing a size of an emulsifier solid via a mechanical attrition process to produce emulsifier particles having:
     a Brunauer/Emmett/Teller (BET) specific surface area of about 0.3 m$^2$/g to about 1 m$^2$/g,
     a BET pore volume of at least 0.001 cm$^3$/g to about 0.005 cm$^3$/g,
     a BET average pore width of about 50 angstroms to about 200 angstroms,
     a bulk density of about 0.3 g/cm$^3$ to about 0.6 g/cm$^3$, and
     a weight average particle size of about 5 µm to less than 80 µm.

2. The method of claim 1, wherein the mechanical attrition process includes at least one of: grinding, milling, or a combination of grinding and milling.

3. The method of claim 1, wherein the liquid includes water.

4. The method of claim 1, wherein cooling the molten emulsifier to produce the emulsifier solid comprises contacting the molten emulsifier with a substrate having a temperature less than the melting point of the molten emulsifier.

5. The method of claim 1, wherein the emulsifier particles comprise an alkali metal salt or an alkaline earth metal salt of a modified tall oil and the method further comprises at least one of:

adding an alkali metal hydroxide, an alkaline earth metal hydroxide, an alkali metal oxide, an alkaline earth metal oxide, or any mixture thereof to a modified tall oil, to produce the alkali metal salt or the alkaline earth metal salt of the modified tall oil;
   reacting a tall oil distillate component and an unsaturated polycarboxylic acid, a carboxylic anhydride, or a mixture of an unsaturated polycarboxylic acid and a carboxylic anhydride, to produce the modified tall oil; or
   a combination thereof.

6. The method of claim 5, wherein at least one of:
   the tall oil distillate component comprises tall oil fatty acids, tall oil rosin acids, or a mixture thereof;
   the unsaturated polycarboxylic acid comprises maleic acid, fumaric acid, phthalic acid, trans-2-hexenedioic acid, trans-3-hexenedioic acid, cis-3-octenedioic acid, cis-4-octenedioic acid, trans-3-octenedioic acid, succinic acid, or any mixture thereof;
   the carboxylic anhydride comprises maleic anhydride, succinic anhydride, or a mixture thereof; or
   a combination thereof.

7. The method of claim 1, further comprising reacting a tall oil distillate component with maleic anhydride to produce the modified tall oil, wherein the tall oil distillate component comprises tall oil fatty acids, tall oil rosin acids, or a mixture thereof.

8. The method of claim 1, wherein the emulsifier particles comprise an alkali metal salt or an alkaline earth metal salt of a carboxylic acid terminated fatty amine condensate, and wherein the method further comprises at least one of:

adding an alkali metal hydroxide, an alkaline earth metal hydroxide, an alkali metal oxide, an alkaline earth metal oxide, or any mixture thereof to a carboxylic acid terminated fatty amine condensate, to produce the alkali metal salt or the alkaline earth metal salt of the carboxylic acid terminated fatty amine condensate;
   reacting a fatty acid amine condensate and a polycarboxylic acid, a carboxylic anhydride, or a mixture of a polycarboxylic acid and a carboxylic anhydride, to produce the carboxylic acid terminated fatty amine condensate; or
   a combination thereof.

9. The method of claim 1, wherein the emulsifier particles have a BET specific surface area of about 0.5 m$^2$/g to about 1 m$^2$/g.

10. The method of claim 1, wherein the emulsifier particles have:
    a bulk density of about 0.4 g/cm$^3$ to about 0.6 g/cm$^3$; and
    a BET average pore width of about 50 angstroms to about 150 angstroms.

11. The method of claim 1, wherein the emulsifier particles have:
    a Krumbein roundness of 0.1 to less than 0.8, and
    a Krumbein sphericity of 0.1 to less than 0.8.

12. The method of claim 1, wherein the emulsifier particles have a BET pore volume of at least 0.0012 cm$^3$/g to about 0.002 cm$^3$/g.

13. The method of claim 1, wherein the emulsifier particles have an average particle size of less than 54 µm.

14. The method of claim 1, wherein the emulsifier particles have:
    a BET specific surface area of about 0.5 m$^2$/g to about 1 m$^2$/g;
    a BET pore volume of at least 0.0012 cm$^3$/g to about 0.003 cm$^3$/g; and
    a BET average pore width of about 50 angstroms to about 150 angstroms.

15. The method of claim 1, wherein the emulsifier particles have:
- a BET pore volume of at least 0.0012 cm$^3$/g to about 0.002 cm$^3$/g; and
- a BET average pore width of about 50 angstroms to less than 100 angstroms.

16. The emulsifier particles of claim 1, wherein the emulsifier particles have:
- a BET specific surface area of at least 0.5 m$^2$/g to about 1 m$^2$/g;
- a BET pore volume of at least 0.0012 cm$^3$/g to about 0.002 cm$^3$/g;
- a BET average pore width of about 50 angstroms to less than 100 angstroms;
- a weight average particle size of about 5 μm to less than 27 μm; and
- an average Krumbein roundness of 0.1 to 0.7.

* * * * *